United States Patent [19]
Sawai et al.

[11] Patent Number: 5,956,315
[45] Date of Patent: Sep. 21, 1999

[54] DISC-CLAMPING DEVICE

[75] Inventors: Kunio Sawai; Katuyuki Yokota; Hideki Kume, all of Osaka, Japan

[73] Assignee: Funai Electric Co., Ltd., Osaka, Japan

[21] Appl. No.: 08/949,446

[22] Filed: Oct. 14, 1997

Related U.S. Application Data

[60] Continuation of application No. 08/545,882, Oct. 20, 1995, which is a division of application No. 08/286,926, Aug. 8, 1994.

[30] Foreign Application Priority Data

| Aug. 9, 1993 | [JP] | Japan | 5-216987 |
| Aug. 11, 1993 | [JP] | Japan | 5-219114 |
| Dec. 1, 1993 | [JP] | Japan | 5-329992 |
| Dec. 1, 1993 | [JP] | Japan | 5-329993 |

[51] Int. Cl.⁶ .................................................. G11B 17/028
[52] U.S. Cl. ................................................................ 369/270
[58] Field of Search .............................. 369/270–271; 360/49.05, 99.08, 99.12

[56] References Cited

U.S. PATENT DOCUMENTS

| 4,958,839 | 9/1990 | Guzik et al. | 369/271 |
| 5,014,143 | 5/1991 | Mori et al. | 360/99.12 |
| 5,303,098 | 4/1994 | Yamamori et al. | 360/99.12 |
| 5,379,287 | 1/1995 | Heinrich | 369/270 |
| 5,501,760 | 3/1996 | Mukawa | 369/270 |
| 5,555,233 | 9/1996 | Yano et al. | 369/270 |

FOREIGN PATENT DOCUMENTS

| 2-128356 | 5/1990 | Japan | 369/270 |
| 2-177053 | 7/1990 | Japan | 369/270 |
| 2-203462 | 8/1990 | Japan | 369/270 |
| 58-194181 | 11/1993 | Japan | 369/270 |

*Primary Examiner*—Brian E. Miller
*Attorney, Agent, or Firm*—Lackenbach Siegel Marzullo Aronson & Greenspan, P.C.

[57] ABSTRACT

To provide a disc clamp mechanism of a disc generative device which enables a space-saving design to decrease the height of the disc regenerative device and decrease the number of parts, also being easily assembled, by setting a turntable having a plurality of penetrated guide holes at insertion portion of the disc hole protruded at the center of a table body, a press-maintenance plate inserted into an axial portion of the turntable slidably by installing a spring between the turntable and a plurality of disc-pressing pieces which fixedly urge the disc on the table body wherein said disc-pressing piece is installed on the press-maintenance plate so as to be swingable by latching with a guide hole and being swung so that the disc-pressing portion may become smaller or larger than the diameter of the disc hole according to the access or separation to or from the table body.

8 Claims, 22 Drawing Sheets

$$|\vec{F_2}| = |\vec{F}| \cdot \cos \alpha$$

$$|\vec{F_4}| = |\vec{F_2}| \cdot \sin \alpha$$

$$= |\vec{F}| \cdot \sin\alpha \cdot \cos\alpha$$

$$= |\vec{F}| \cdot \tfrac{1}{2} \cdot \sin(2\alpha)$$

$$\sin(2\alpha) = 1 \quad |\vec{F_4}| = \max$$

$$\therefore 2\alpha = 90° \quad \alpha = 45°$$

$$\vec{F} = \vec{F_1} + \vec{F_2}$$
$$\vec{F_2} = \vec{F_3} + \vec{F_4}$$

DISC-CLAMPING DEVICE

This application is a continuation, of application Ser. No. 08/545,882, filed Oct. 20, 1995; which is a division of Ser. No. 08/286,926, filed Aug. 8, 1994.

BACKGROUND OF THE INVENTION

The present invention relates to a disc-clamping device for fixedly maintaining a disc on a turntable when the disc is inserted into a box of a disc device.

A conventional disc-clamping device is arranged higher than a disc-charging position opposing the turntable of the clamping member, and is adapted to fixedly maintain the disc between said clamping member and the turntable by lowering said clamping member or raising the turntable side after inserting a disc-loading tray into the disc device box.

However, one of the drawbacks of the above conventional disc clamping device is that disc device cannot be made narrower because said device arranges the clamping members by opposing them above and below the turntable and occupies a high percentage of the space in the upper and lower portions of the device box. Further, in order to secure the accuracy of the relative position of the clamping member and turntable, parts must be accurately assembled.

As a disc clamp mechanism for a disc play-back device which regenerates a disc such as a CD-ROM (compact disc) or the like, it is known that a disc is clamped onto a turntable with a magnet-type clamp member at the upper portion of the disc.

However, in the disc clamp mechanism of the conventional disc regenerative device, the clamp member is arranged over the disc, which makes the height of the disc regenerative device higher, thereby increasing the number of parts and complicating assembly of the device.

In addition, in the conventional disc clamp device, an elastic O-ring 51 is inserted around an outer side of a cylindrical axis 50a projected to the intermediate portion of the upper surface of the turntable as shown in FIG. 31 and lower end portions 52b of a guide member 52 having a plurality of ball holes 52a (e.g., 3 ball holes) equally distributed thereon, are forcibly inserted into the turntable 50 with said cylindrical axis 50a covered by said guide member 52.

A plurality (e.g., 3) of steel balls 53, 53, 53 are equally distributed to said ball holes 52a, respectively, and are elastically energized toward the outside by said O-rings 51.

However, since in the O-ring 51 the conventional disc clamp device loses its elasticity as time passes, the elastic force to the steel ball 53 gradually decreases. In addition, in the conventional disc clamp device, a separate step to forcibly insert the guide member 52 into the turntable 50 is required.

BRIEF DESCRIPTION OF THE INVENTION

This invention provides a compact disc-clamping device suitable for a disk play-back device wherein a clamping means is mounted by utilizing a space below a turntable so as to maintain the conventional clamping performance and increase assembly accuracy in its construction, thereby reducing height of the whole device and making the device thin.

In addition, the object of this invention is to provide a disc clamp mechanism for a disc regenerative device in which the turntable itself is provided with the disc clamp mechanism, and thereby the number of parts can be decreased.

Furthermore, this invention is performed in view of the above and provides a disc clamp device which overcomes the conventional defects by forming the guide member integrally and simultaneously with the turntable, at the same time generating an elastic force to a ball by means of a coil spring through a pushing plate.

For this purpose, a disc-clamping device of this invention is one which moves the shucking hook provided on the turntable in a radial direction of the disc and urges said clamping hook to the turntable side to clamp the disc on the table, said clamping device being provided with a cam plate having a cam groove which slides said clamping hook in the disc radial direction together with slidably combining the clamping law to a base plate and a rotating means of the cam plate which rotates said cam plate according to the transference of said base plate, thereby controlling the clamping hook connected with said cam groove according to the rotation of the cam plate due to said rotation means.

Accordingly, there is no need for a clamping means space above the turntable, and the device box is made to be thin as a whole. Further, clamping means assembly becomes advantageous in construction, thereby easily maintaining the necessary assembling accuracy.

In order to overcome the above drawbacks, the disc clamp mechanism of the disc regenerative device according to this invention is characterized by being constituted with a turntable wherein an insertion portion of a disc hole having a disc form is protruded at the intermediate portion of the table body, a press-maintenance plate provided slidably at an axial portion of the above turntable inserting a compression coil spring between said table body, and a disc-pressing piece provided swingably at said press-maintenance plate.

In the above means, a disc clamp mechanism is provided on the turntable itself.

This invention is characterized by being provided with a turntable, a guide member projected to the upper surface of said turntable, a plurality of spring receivers projected to the lower surface of said turntable, a pressing plate having an inclined surface loosely inserted into a boss installed in an upright position at said guide member, a plurality of balls arranged at a plurality of ball holes, further forming a pinching angle less than 180° in an outward direction against said ball center by contact point of said pressing plate in the ball arranged at said ball hole and the contact point of said guide member, further making a pinching angle less than 180°, said pinching angle being inclined obliquely downward toward the outside.

Further, an approximately horizontal even surface having a certain width or an ascending inclined surface is extendedly provided at the end edge of said pressing plate. Said inclined surface comprises the clamping inclined surface and the inclined surface for transference extended therefrom. At the lower surface of said pressing plate, a plurality of projections which contact with said compression coil spring are provided.

The ball is elastically energized outward by means of a coil spring.

When installing the disc on the turntable, when the inside of the disc hole abuts against the ball, the ball pushes down the pressing plate along the inclined surface and each ball moves in a central axis direction. When the disc contacts closely with the upper surface of the turntable, the projection portion of the ball pushes down the upper edge of the inside of the disc hole so as to be maintained.

The flat end surface or the ascending inclined surface of the edge portion of the inclined surface of the pushing plate restrains urged pressure in an outer circumferential direction against the ball on the inclined surface where the disc is not installed on the turntable.

Since the inclined surface is divided into the clamping inclined surface and the inclined one for immigration, the relation between strength of the elastic force given to the ball and a position where the ball retreats in the axial direction of the turntable can be set when the disc is installed.

Further provided in this invention are a turntable, guide member projecting to the upper surface of said turntable, a plurality of ball holes provided at said guide member, a plurality of balls arranged at said ball holes, a coil spring installed between a plurality of balls and a plurality of spring receivers, and a contact point to said guide member at the ball arranged to said ball hole and a contact point to said coil spring making a pinching angle less than 180° (<180 degrees) outward away from the center of said ball.

The ball is elastically energized outward by a coil spring.

When installing the disc on the turntable, when the ball abuts against the inner side of the disc hole, each ball moves in the direction of the central axis of the turntable. When the disc contacts closely to the upper surface of the turntable, the projected portion of the ball pushes down the upper edge of the inner side of the disc hole to preserve it.

DETAILED DESCRIPTION OF THE INVENTION

Figure 1:
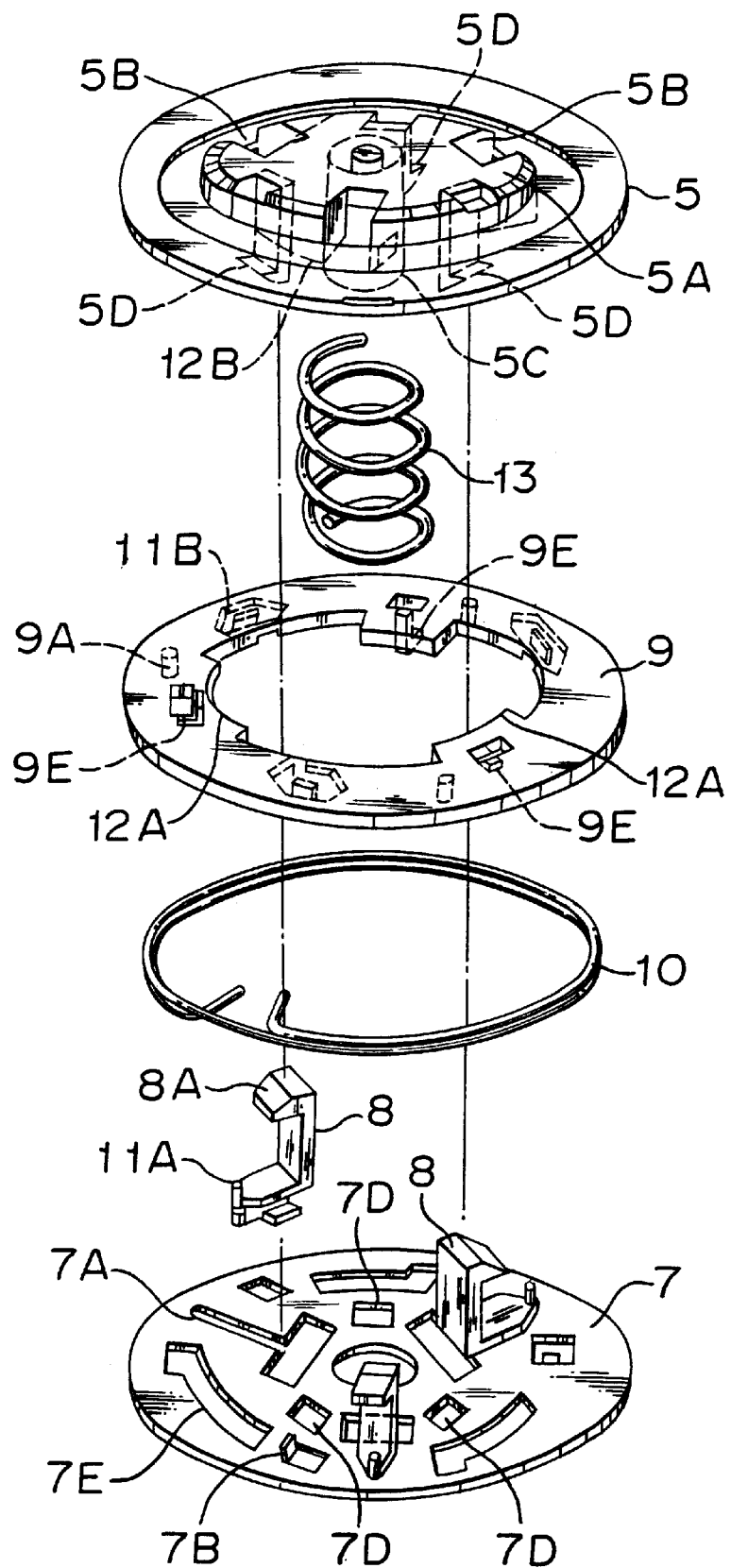
FIG. 1 is an exploded perspective view of an embodiment of the present invention.
Figure 2:
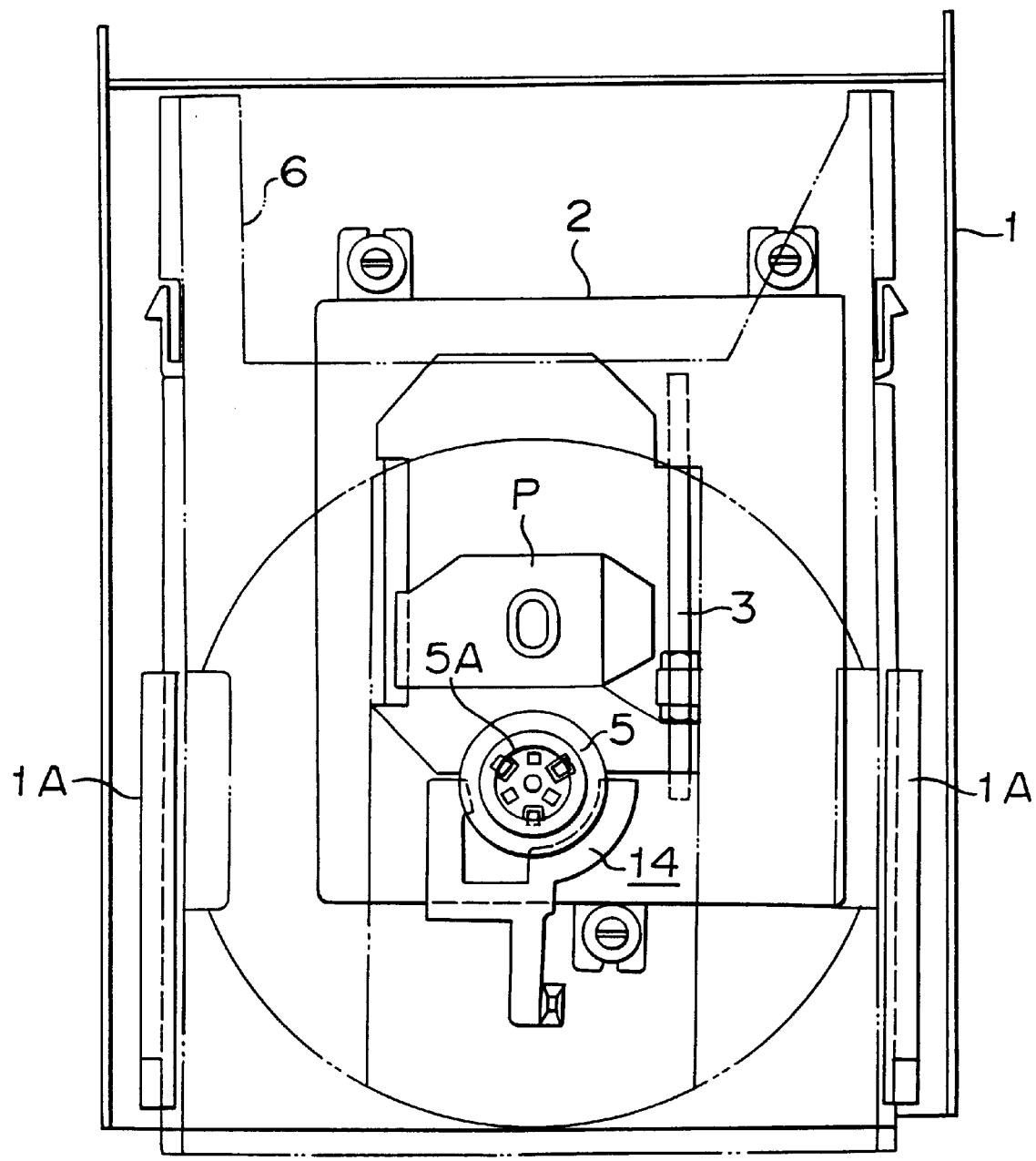
FIG. 2 is a plan view which shows a material part of an embodiment of this invention.
Figure 3:
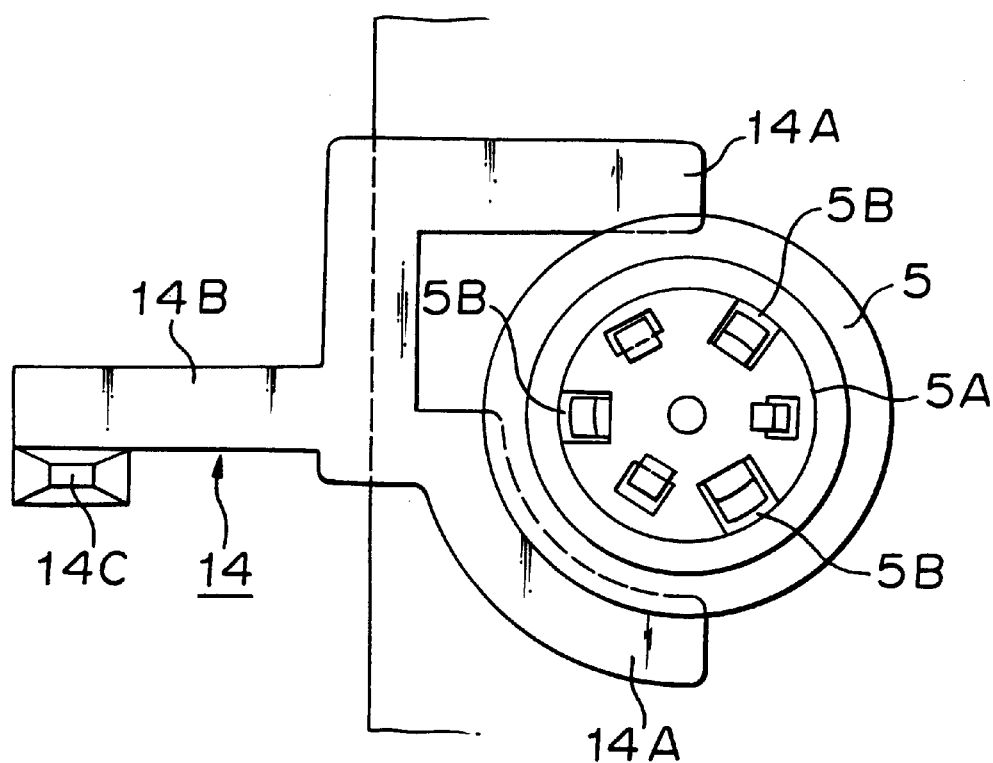
FIG. 3 is an enlarged plan view of the clamping device of the above embodiment.
Figure 4:
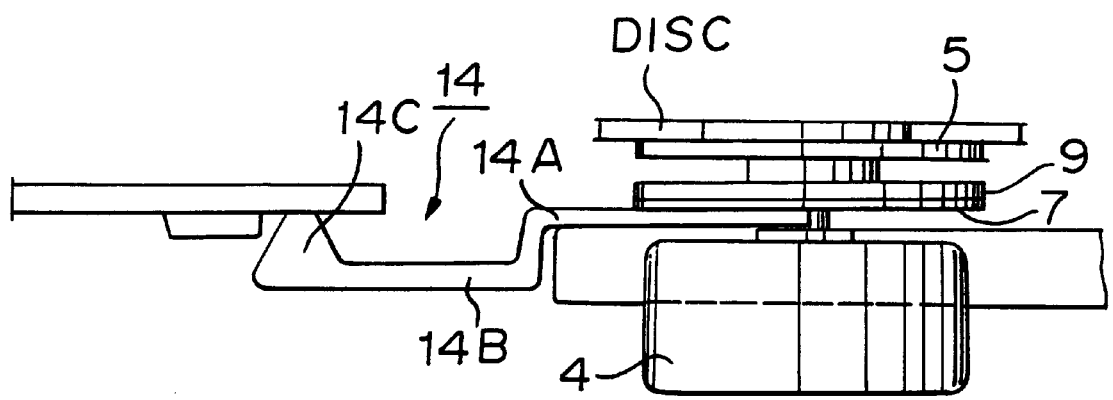
FIG. 4 is a longitudinal side view of the same clamping device.
Figure 5:
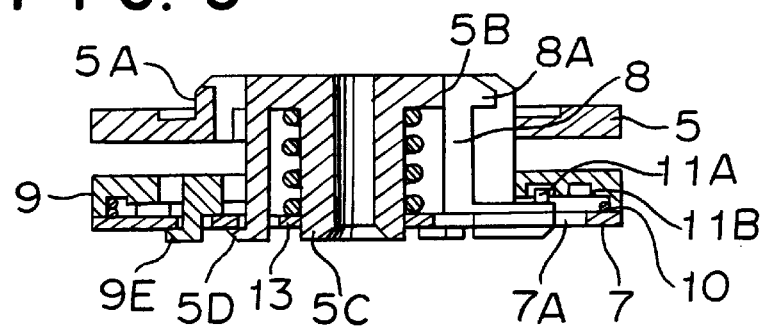
FIG. 5 is a longitudinal side view which shows an initial state of the clamping device of the above embodiment.
Figure 6:
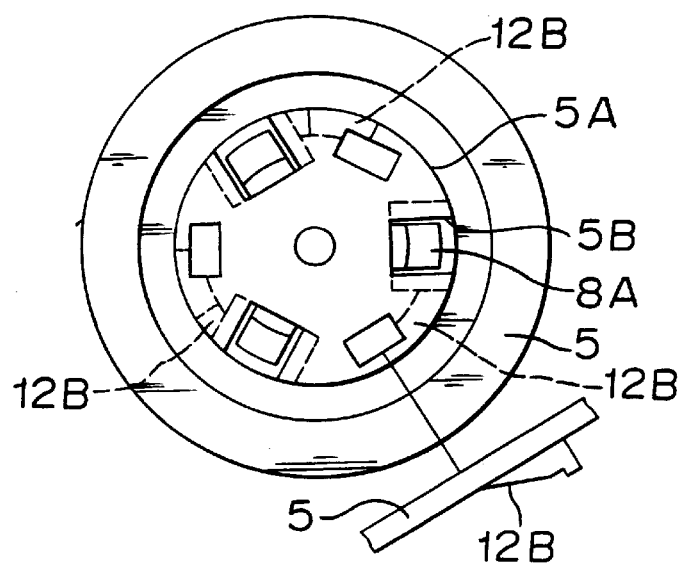
FIG. 6 is a plan view of a turntable of the above embodiment.
Figure 7:
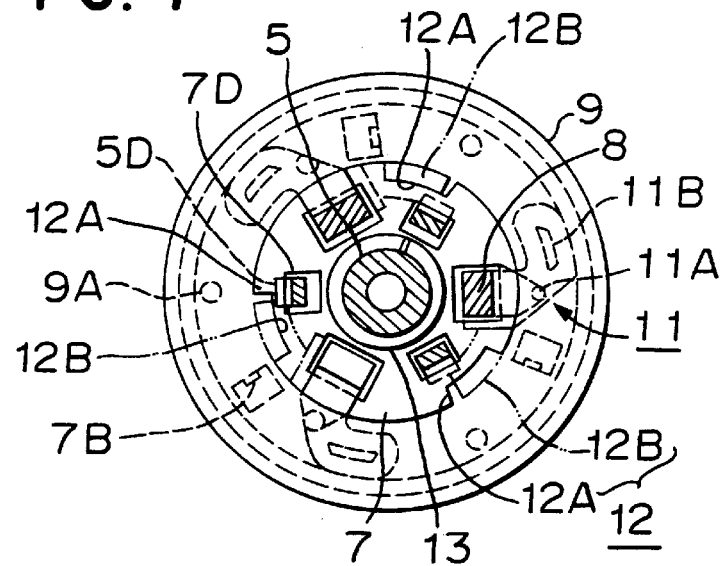
FIG. 7 is a plan view of a cam plate of the same embodiment.
Figure 8:
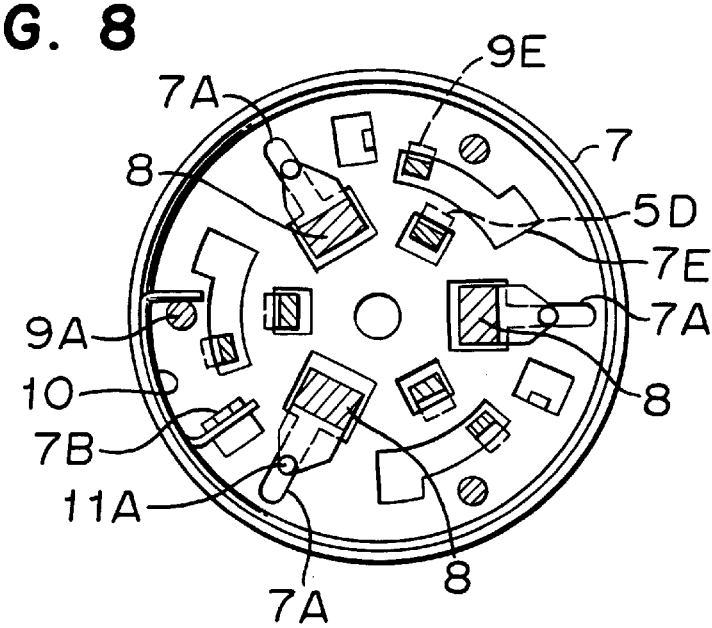
FIG. 8 is a plan view of a base plate of the same embodiment.
Figure 9:
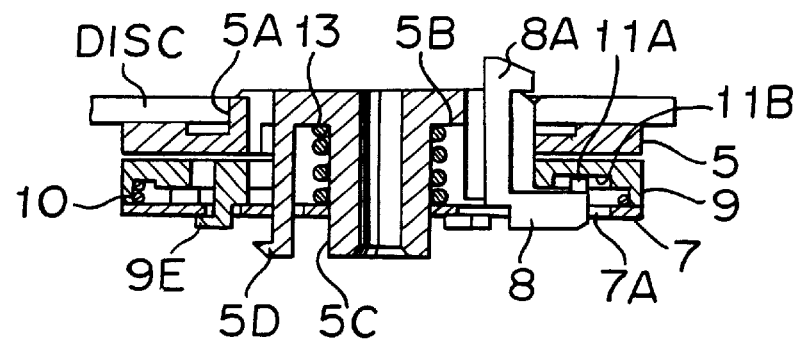
FIG. 9 is a longitudinal side view which shows disc-loading of the clamping of the above embodiment.
Figure 10:
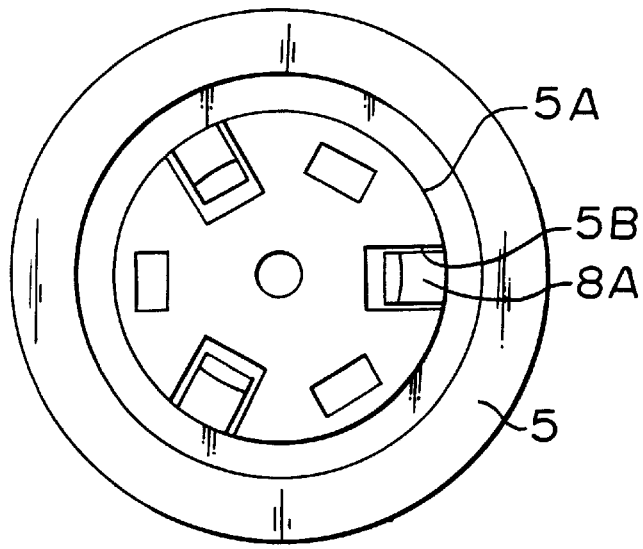
FIG. 10 is a plan view of the turntable of the same embodiment.
Figure 11:
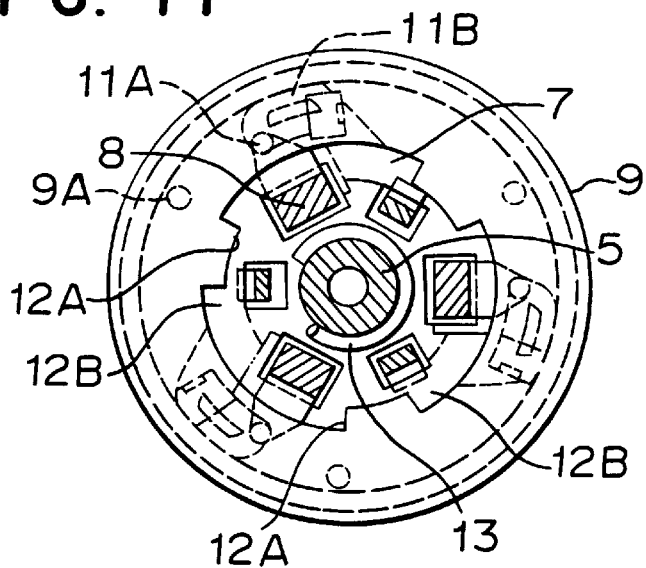
FIG. 11 is a plan view of the cam plate in the same embodiment.
Figure 12:
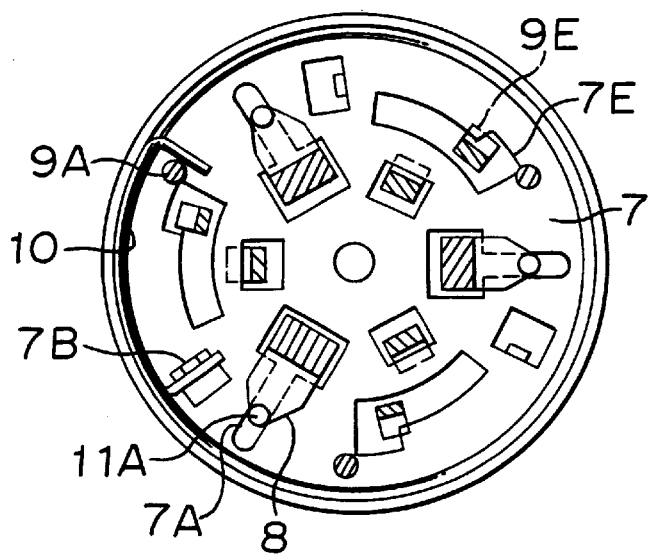
FIG. 12 is a plan view of the base plate in the same embodiment.
Figure 13:
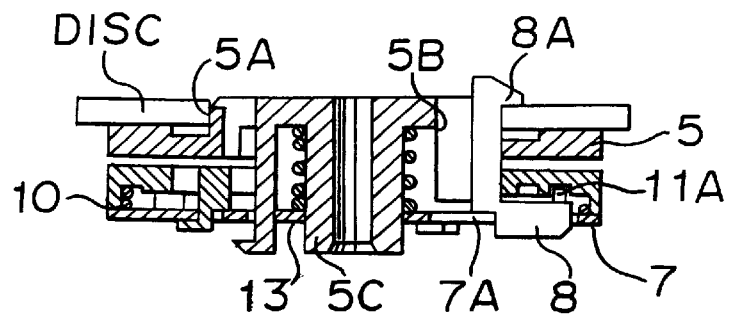
FIG. 13 is a longitudinal side view which shows a clamping state of the clamping device of the above embodiment.
Figure 14:
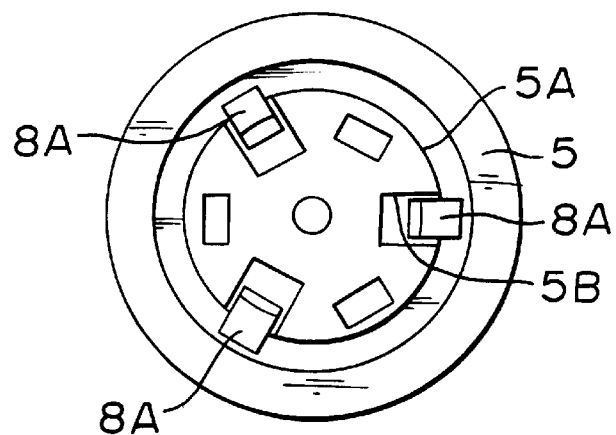
FIG. 14 is a plan view of the turntable in the same embodiment.
Figure 15:
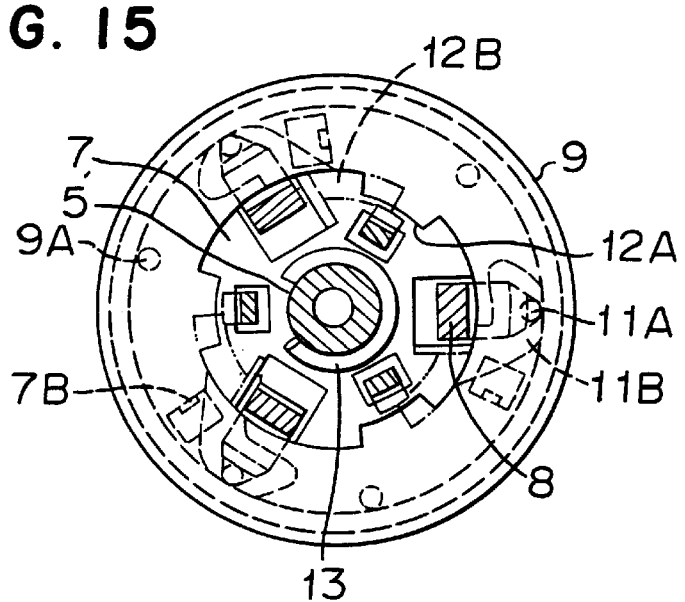
FIG. 15 is a plan view of the cam plate in the same embodiment.
Figure 16:
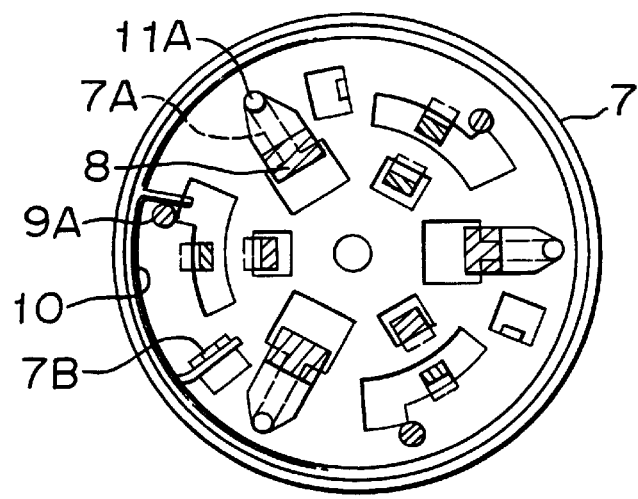
FIG. 16 is a plan view of the base plate in the same embodiment.
Figure 17:
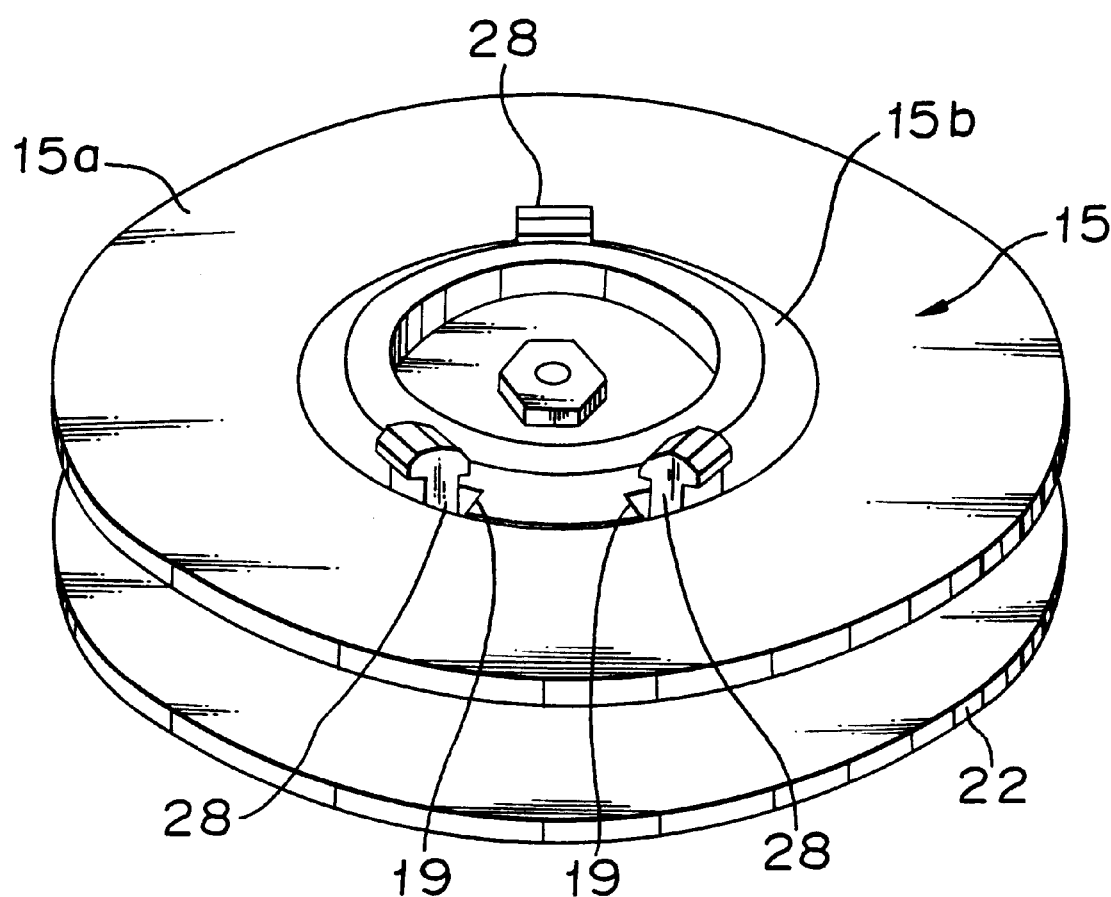
FIG. 17 is a perspective view which shows another embodiment of a disc clamp mechanism of this invention.

An embodiment of this invention will be described with reference to the drawings as follows.

FIG. 1 to FIG. 4 are drawings which show an embodiment of this invention.

In the Figures, an optical disc device according to this invention is provided with a chassis 2 in a device body 1, and an optical pick-up P is supported by the guide 3 so as to be able to move in a radial direction and mount a disc-driving motor 4 at a disc installation position. A tray 6 for loading the disc is provided on a turntable 5 rotatably driven by said motor 4. The tray 6 is adapted to be guided to the front and rear along guide rails 1A and 1A provided at both sides of the device body 1. Further, in this embodiment, the optical disc device is constructed for the disk to be able to descend on the turntable 5 at the disc-loading position.

Particularly, the disc-clamping device for fixing the disc of this invention on the turntable 5 mounts an insertion portion 5A which inserts into an installation hole of the disc by projecting it like a trapezoid at the intermediate portion of the turntable 5 and a plurality of inducing holes 5B (in this embodiment, 3 inducing holes having a phase difference of 120° in a circumferential direction) which penetrate vertically by positioning at inner side of the periphery of the insertion portion 5A, are formed at the turntable 5. A disc-type base plate 7 is provided so as to be able to move up and down below the turntable 5. On the base plate 7 are formed a plurality of slit-like slide guides 7A which extend in radial directions of the disc corresponding to the inducing holes 5B, respectively. Furthermore, the clamping hook 8 is maintained slidably on the base plate 7 along said slide guide 7A, thereby projecting an upper end latching portion (a tip of the hook) 8A on the turntable 5 by way of the inducing hole 5B.

Still further, a ring-like cam plate 9 is supported rotatably against the base plate 7 between the base plate 7 and the turntable 5 thereby being energized by the spring force in a rotational direction. As a spring energizing means of the cam plate 9, a torsion spring having a coil form 10 arranged along the inner circumferential wall of the cam plate 9 is adopted in this embodiment, one end thereof being latched with a hook 7B of the base plate side 7, while another end thereof is latched with a hook 9A of the cam plate side 9.

In addition, there is provided a first cam means 11 which leads the clamping hook 8 to the outer side in a disc radial direction along the slide guide 7A when the cam plate 9 rotates relative to the base plate 7 by said spring force. Especially in this embodiment, the cam means 11 comprises a protective cam follower 11A provided at the cam plate side of the Shucking hook 8 and a cam groove 11B having nearly a loop form formed at the surface of the base plate side 7 of the cam plate 9 for guiding the cam follower 11.

A second cam means 12 which rotates the cam plate 9 against the spring force of the torsion spring 10 at the ascending time of the base plate 7 is separately provided. The clamping hook 8 can thus be led to the inner side of the disc radial direction along the slide guide 7A. In other words, the cam means 12 of this embodiment is constructed of three cam followers 12A formed like a cutaway at an inner circumferential side of the cam plate 9 and three cams 12B having tapers respectively formed at the lower surface of the turntable 5 corresponding to these cam followers 12A, said tapers of the cams 12B being inclined in upward and downward directions in regard to the circumferential direction of the turntable 5. Further, a spring means 13, such as a compression coil spring which elastically supports the base plate 7 downwardly against the turntable 5 so as to enclose a boss part 5C of the turntable 5, is provided between the turntable 5 and the base plate 7.

In this case, the turntable 5 is combined with the base plate 7 by a latching piece 5D which is latched with a hole 7D of the base plate 7.

In the same way, the cam plate 9 is also combined with the base plate 7 by latching a latching piece 9E with a slit 7E of the base plate 7.

In more detail, the disc-clamping device of this invention is provided with an ascending and descending means 14 which moves the base plate 7 up and down by interlocking with tray 6. The ascending and descending means 14 in this embodiment is provided with a lever member 14B having a fork-like supporting portion 14A which supports the base plate 7 from the lower surface and a swinging means (not shown) which swings the lever member 14B vertically on the chassis, the front end portion of said lever member 14B having an angle steel cam portion 14C formed. When the tray 6 is loaded, the cam portion 14C is urged, whereby the clamping member 7 is pressed up against the spring means 13 of the compressed coil spring.

In such disc-clamping device thus constructed, an optical disc is placed on the tray 6 and inserted from an opening at the front of the device body 1. The lever member 14 revolves by urging operation to the cam portion 14C at a step where the optical disc is guided on the turntable 5, thereby causing the base plate 7 to ascend by aid of the supporting portion 14A. At this ascending step, the clamping hook 8 projects the tip of hook 8A (upper end latching portion) to the upper side of the disc through the installation hole of the optical disc as shown in FIG. 5 to FIG. 8. During this time, the cam follower 12A of the cam plate 9 is guided to the inclined surface of the cam 12B formed at the lower surface of the turntable 5. The cam follower 11A of the clamping hook 8 is thus guided to cam groove 11B of the cam plate 9 to pivot the cam plate 9 in a direction where the torsion spring 10 is energized. For this purpose, the cam follower 11A of the clamping hook 8 is guided to the cam groove 11B of the cam plate 9 to move the tip of hook 8A of the clamping hook 8 to the outer side of the radial direction of the disc as shown in FIG. 9 to FIG. 12.

After that, the lower support of the base plate 7 due to the lever member. 14B is removed by removal of the urged pressure to the cam portion 14C (at the step soon after the optical disc is placed on the turntable 5) and the base plate 7 is descended by the operation of the spring means 13 whereby the clamping hook 8 is latched to the edge of the installation hole of the disc. At this time, the cam follower 11A of the clamping hook 8 is on the way to the cam groove 11B as shown in FIG. 13 to FIG. 16. Accordingly, the clamping hook 8 can maintain the latching of the disc because said clamping hook 8 does not return to the inner side of the radial direction of the disc.

When the disc is removed from the turntable 5 and the lever member 14B pushes up again, the clamping hook 8 is guided to the inner side whereby the clamping hook 8 is unlatched from the disc. Then, when the disc is lifted up from the turntable 5 and the above pushing force is removed, the base plate 7 descends by operation of the spring means 13 and, at the same time, the cam plate 9 performs a reverse revolution by the operation of the torsion spring 10 and guides the cam follower 11A by the cam groove 11B to set the clamping hook 8 to the inner side of the disc radial direction.

Since this invention is constructed as described above, it is possible to reduce the height direction of the whole device and to make the device thinner, securing the conventional clamping function. Furthermore, this invention is easy to assemble, and high assembly accuracy and the like can be maintained.

Another embodiment of this invention will be described with reference to FIGS. 17 to 20.

Figure 18A:
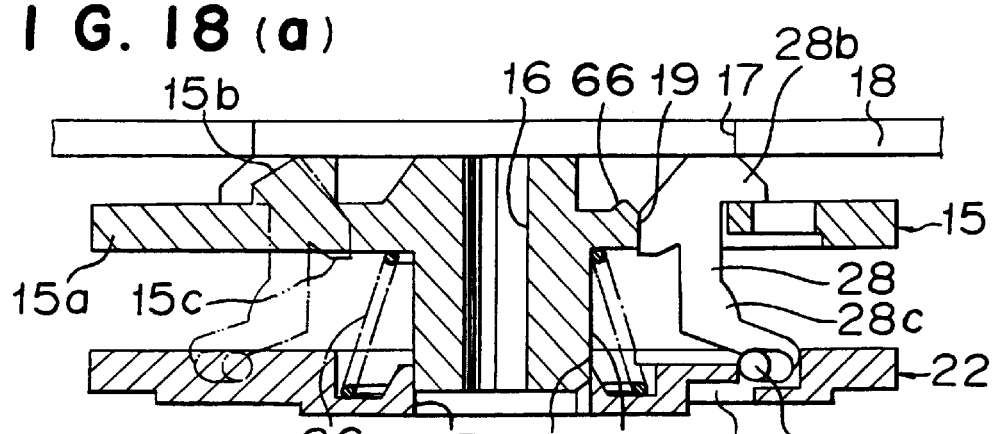
FIG. 18 are operation diagrams of the above disc clamp mechanism.
Figure 18B:
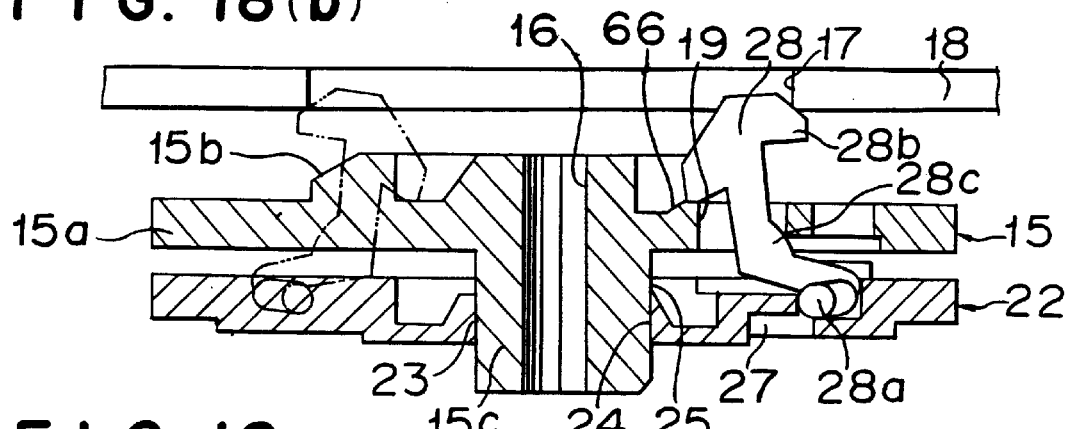

In the figures, 15 is a turntable, said turntable 15 including a table body 15a having a circular plate, a circular disc hole insertion portion 15b protruded into an upper surface center of the table body 15a and a cylindrical axial portion 15c protruded into the lower surface center of the table body 15a and fitted to the rotationary axis of a spindle motor (not illustrated) through an axial hole 16 provided at the axial portion 15C and further placing the disc 18 (please see FIG. 18(a)) inserted into the insertion portion 15b of the disc hole through the disc hole 17 on the table body 15a.

At the disc hole insertion portion 15b of the turntable 15, a plurality (e.g., 3 pieces) of guide holes 19 are provided separately at equivalent distances in the circumferential direction.

At the lower portion of the axial part 15 of the turntable 15, a press-maintenance plate 22 having a circular plate form is inserted slidably in the axial direction through the insertion hole 23 provided at the center thereof. The press-maintenance plate 22 is adapted to obstruct the revolution of the axis by latching a plurality of key grooves 24 provided around the inner side of the insertion hole 23 to the key portion 25 of the axial portion 15C of the turntable.

The press-maintenance plate 22 is energized in a separate direction from the table body 15 by the compression coil spring 26 inserted in the axial portion 15C between the press-maintenance plate 22 and the table body 15a of the turntable 15, said press-maintenance plate 22 being provided with a plurality (e.g., 3 pieces) of pressing installation holes 27 having plan letter "H" by corresponding to each guide hole 19 of the turntables 15.

At each pressing installation hole 27, a disc-pressing piece 28 is installed so as to be able to swing in a radial direction through a rotating shaft portion 28a provided at the base area and a disc-pressing portion 28b provided at the end portion thereof is latched to a guide hole 19 of the turntable 15 by being protruded from the guide hole 19. The cam portion 28C provided at an intermediate portion is slidably mounted to the inner wall surface of the outer side of the guide hole 19.

Figure 18C:
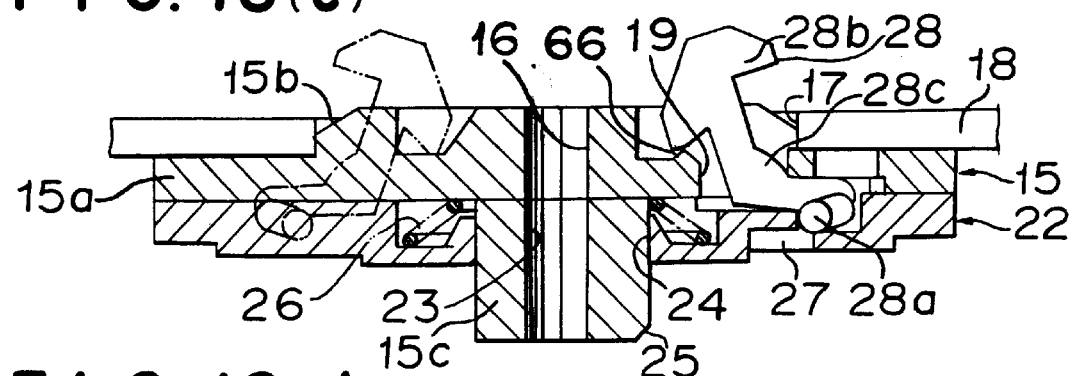

The above disc clamp mechanism is positioned so that the upper surface of the disc-pressing portion 28b of the disc-pressing piece 28 may be a surface equivalent to the upper surface of the disc hole insertion portion 15b at a non disc-clamp time as shown in FIG. 18(a). In order to clamp the disc 18 on the table body 15a in this state, when the press-maintenance plate 22 is accessed to the turntable 15 side against the energized force of the compression coil spring 26 through the operation plate arranged at the lower surface of the press-maintenance plate 22, the cam portion 28c of the disc-pressing piece 28 abuts against the inner wall surface of the outer side of the guide hole 19, whereby the disc-pressing portion 28b of each disc-pressing piece 28 inclines toward the inner side (FIG. 18(b)), and whereby an imaginary circle formed by the upper most "protruding head" portions of the plurality of disc-pressing pieces 28 becomes smaller than the diameter of the disc hole 17 of the disc 18, thereby enabling placement of the disc 18 on the table body 15a as shown in FIG. 18(c).

Figure 18D:
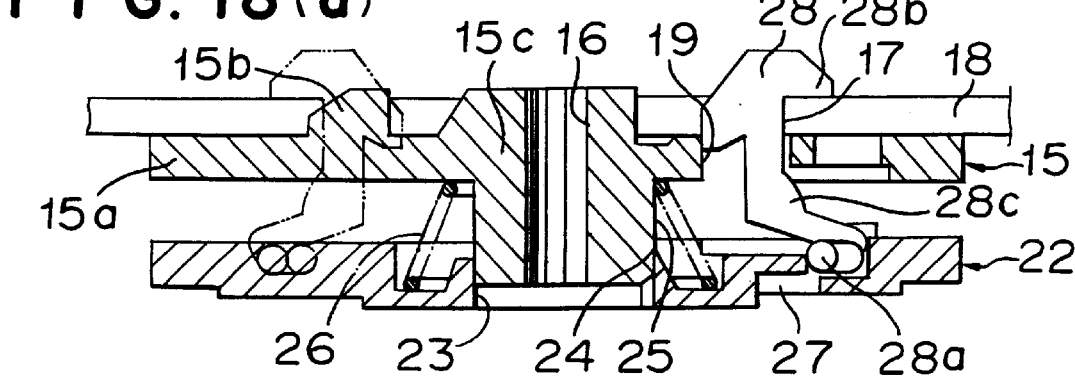
Figure 19A:
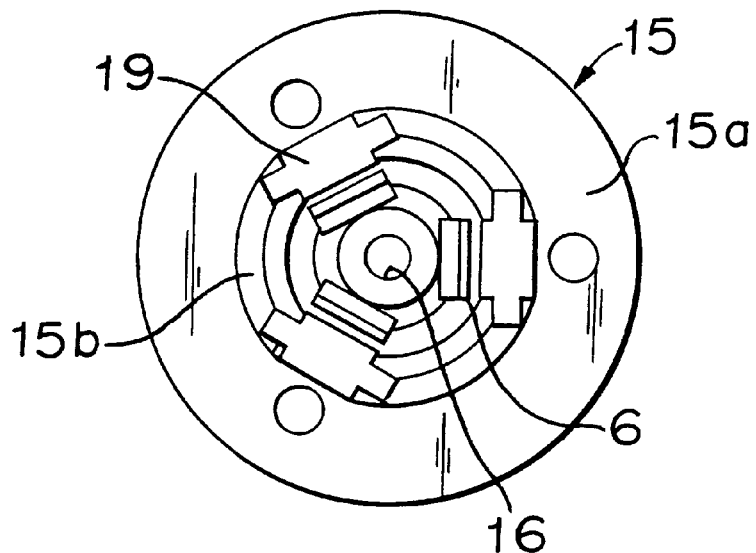
FIG. 19(a) is a plan view of the turntable and (b) is a plan view of the press-maintenance plate in FIG. 17.
Figure 19B:
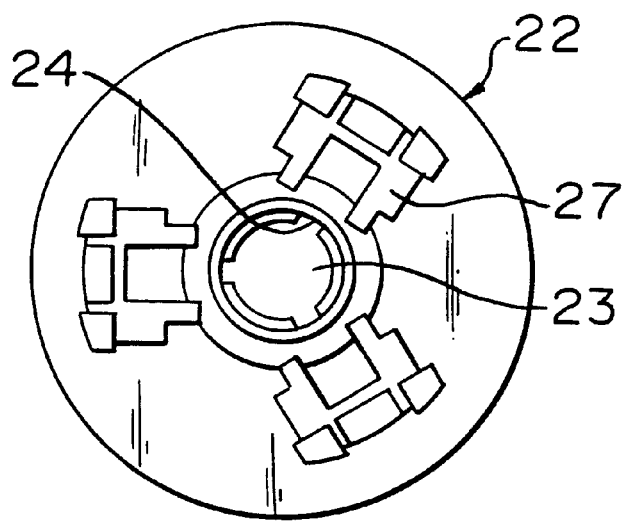
Figure 20:
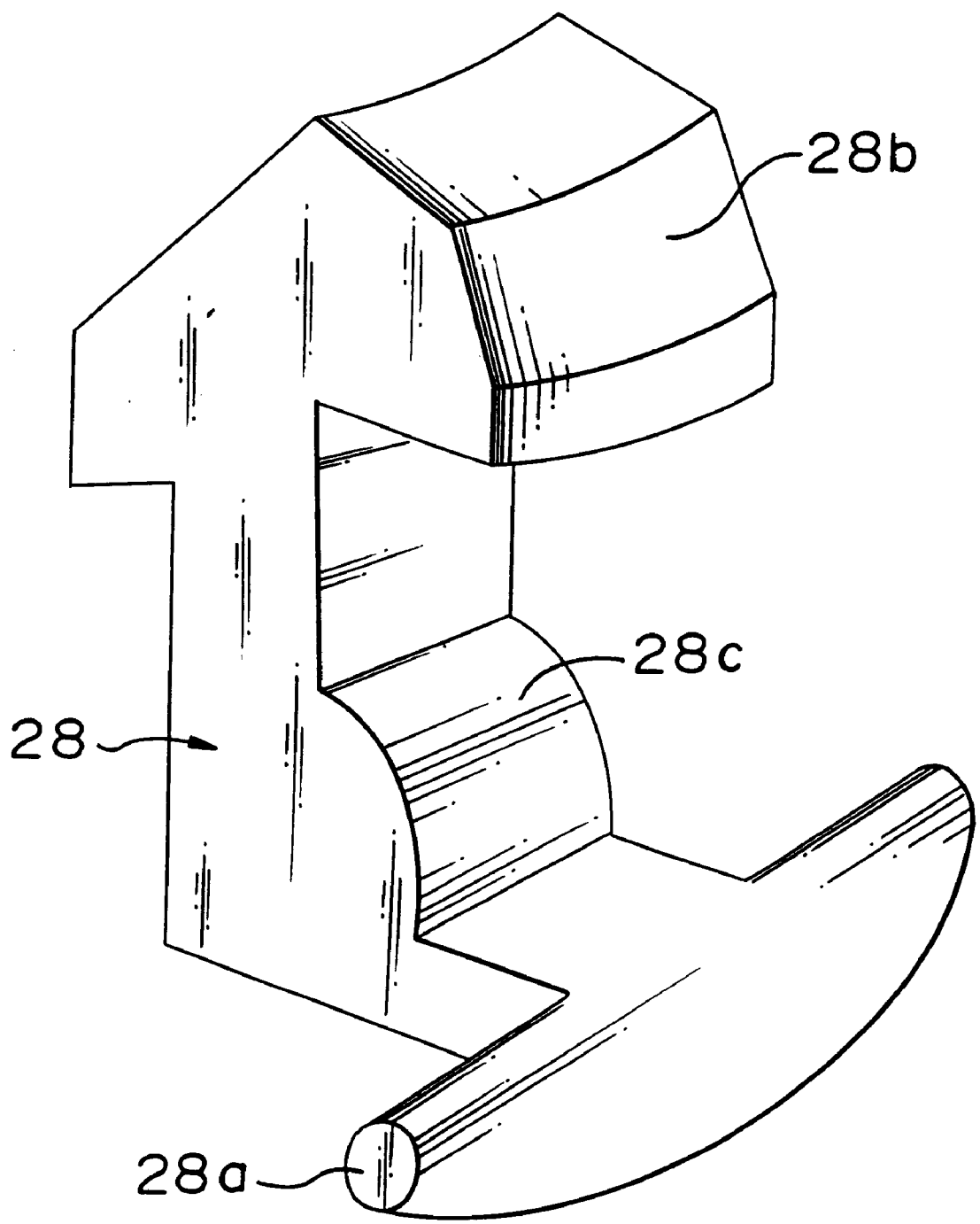
FIG. 20 is a perspective view of the disc pressing piece in FIG. 17.

Then, when the press-maintenance plate 22 separates from the return table 15 by the energized force of the compression coil spring 26, the disc-pressing piece 28 is swung reversely, sliding on a guide hole 19 or a convex protuberance 66 provided in said turntable 15, in the radial direction, and the envelope curve becomes a larger diameter than the disc hole 17 and descends whereby the disc 18 is fixedly urged on the upper surface of the table body 15 by pinching it with disc-pressing portion 28b and table body 15 by aid of energized force of the compression coil spring 26 as shown in FIG. 18(d).

The withdrawal of the disc 18 is carried out by bringing the press-maintenance plate 22 near the disc table 15 through the operation plate and reducing the envelope curve made by disc pressing portion 28b of each disc-pressing piece 28.

As described above, according to the disc clamp mechanism of the disc generative device of this invention, there is no need to arrange the clamp member at the upper portion of the disc as before because the turntable itself is equipped with a disc clamp mechanism. Accordingly, it is possible to effect a space-saving design by lowering the height of the disc regenerative device, thereby being able to decrease the number of parts and to make assembly easy.

Another embodiment of this invention is described in detail with reference to FIGS. 21 to 28.

Figure 21A:
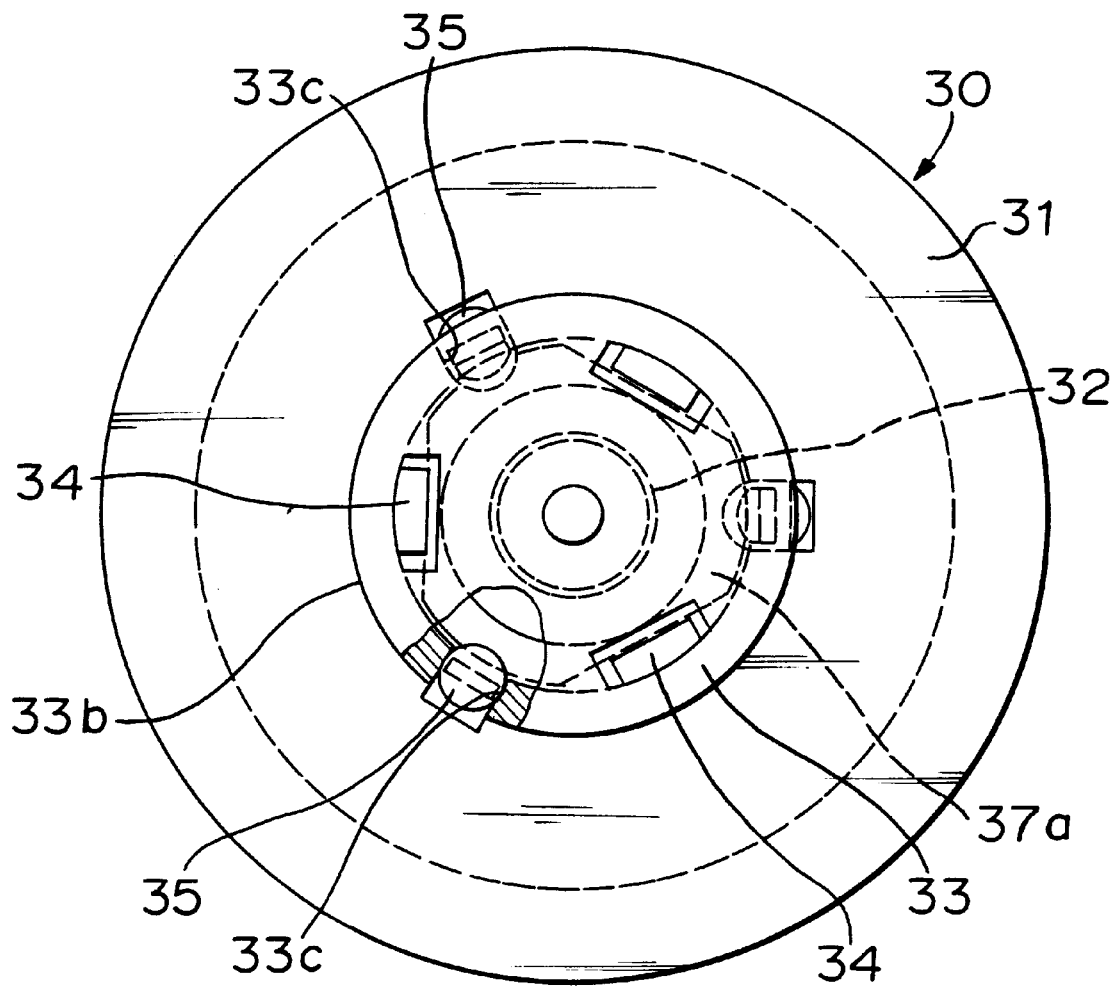
FIG. 21 is a view which shows another embodiment of this invention, (a) being a plan view d (b) a whole side view thereof.
Figure 21B:
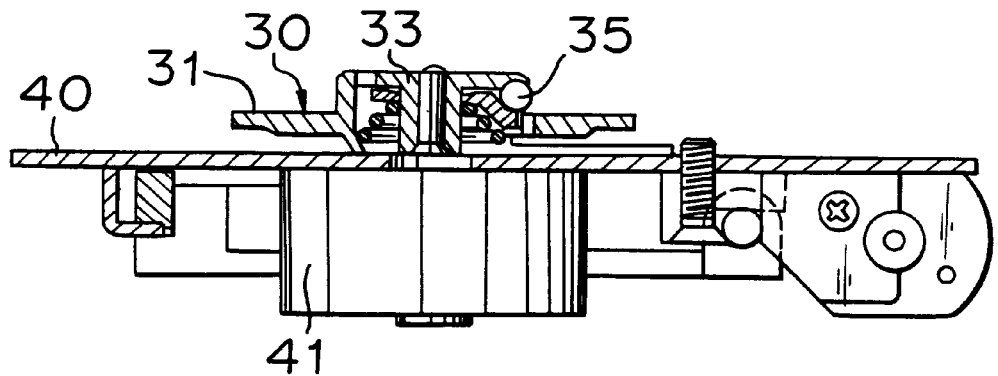
Figure 22:
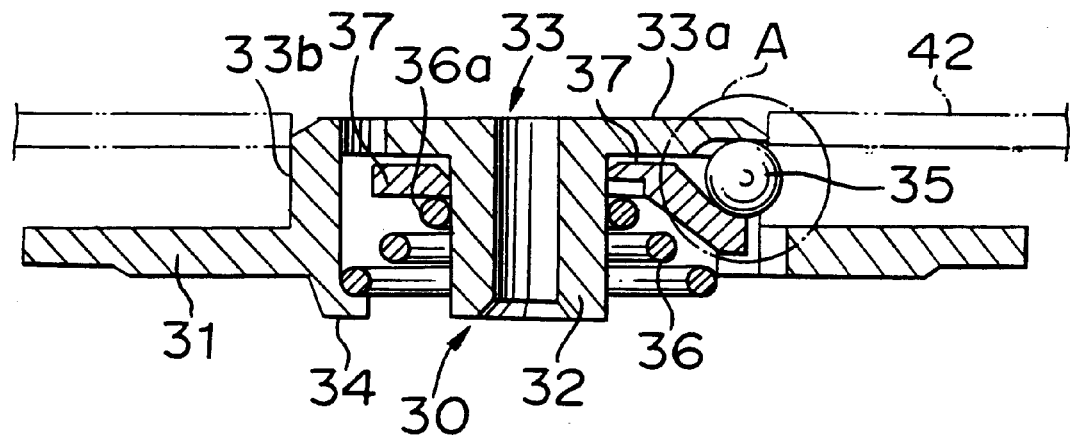
FIGS. 22 (a) to (c) are operational explanation diagrams when the disc is installed to the disc clamp device.
Figure 22:
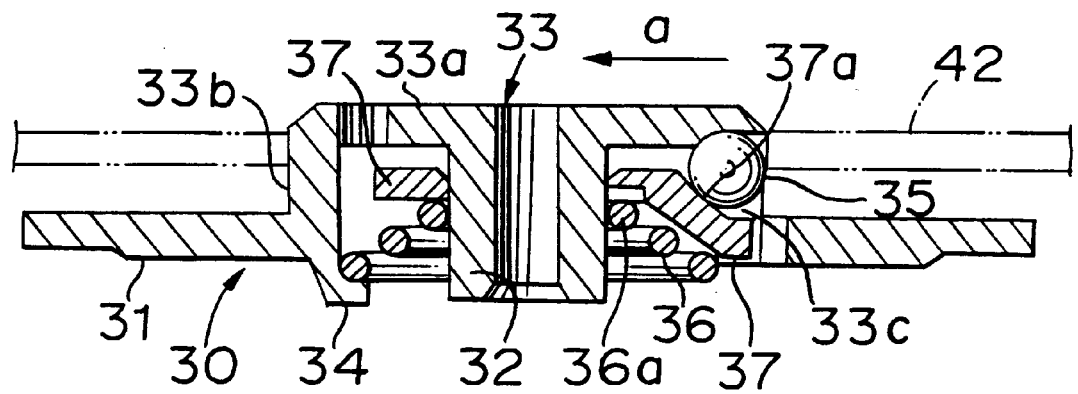
Figure 22:
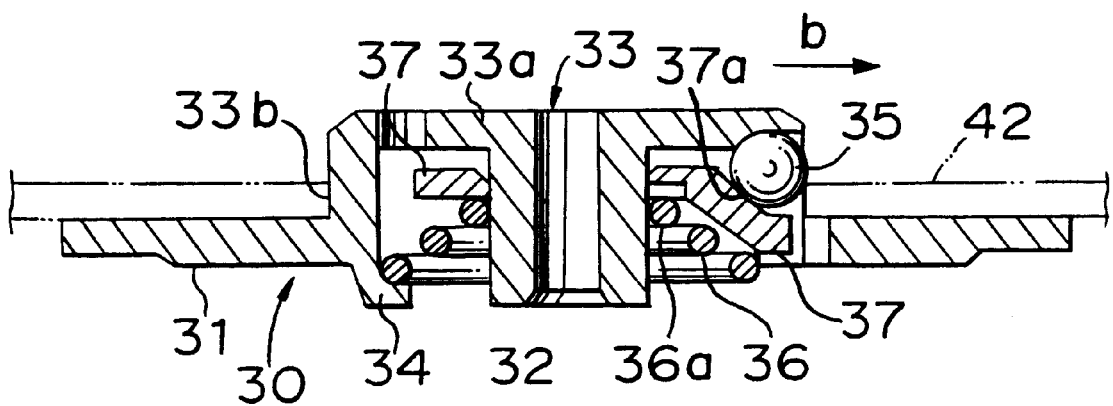

FIG. 21 is a plan view and a whole side view of the disc clamp device of this invention, and FIG. 22 is an operational diagram when the disc is equipped.

In the figures, 31 is a table portion, 33 is a guide member and 32 is a boss, said guide member 33 protruding to the central portion of the upper surface of the turntable 30 and formed as a cylinder having a closed lid 33a at the upper surface thereof. At the center of the lower surface of said turntable 30, a plurality (e.g., 3 pieces) of spring receivers 34 are provided concentrically about said guide member 33. Also cylinder 33b is shown as well as a plurality (e.g., 3 places) of ball holes 33c which are also provided in the disc chucking device.

Arranged at the boss 32 installed upright at the center of the lower surface of the lid 33a in said guide member 33 is a pressing plate 37 having an inclined surface and a diameter inserted loosely therein.

At the above ball holes 33c provided at the above 3 places are arranged steel balls 35 respectively, each steel ball 35 contacting the inclined surface 37a of said pressing plate 37 and the ball hole 33 with lower and upper portions thereof, respectively, one part thereof being protruded toward the outside in this contacting state.

The above steel balls may be hard plastic or metals other than steel.

Further, a compression coil spring 36 is arranged between the lower surface of said pressing plate 37 and said spring receiver 34.

Furthermore, 40 is a chassis and 41 is a motor.

Figure 24A:
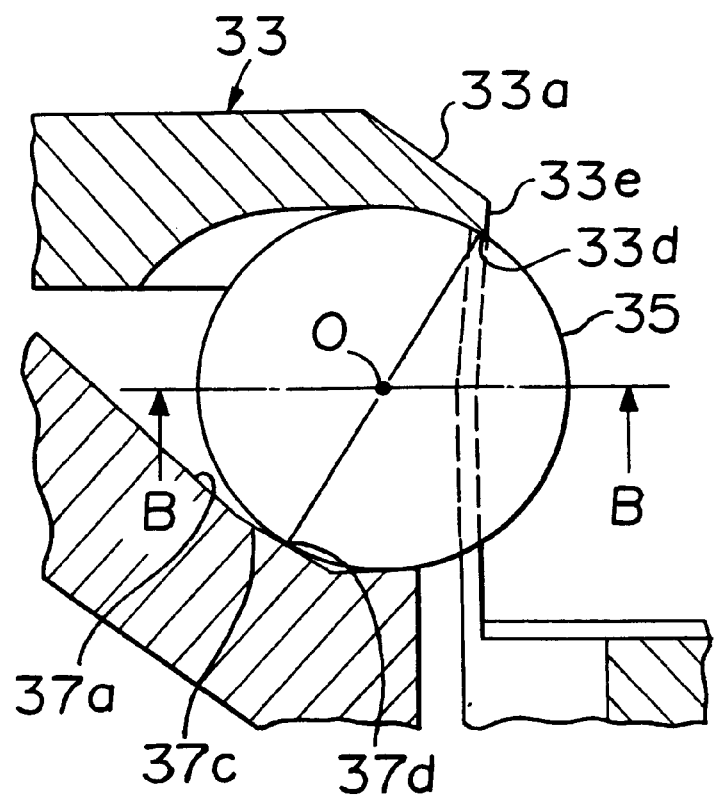
FIG. 24(a) is an enlarged view of a part of FIGS. 22 and (b) is a sectional view taken along line B—B of (a).
Figure 24B:
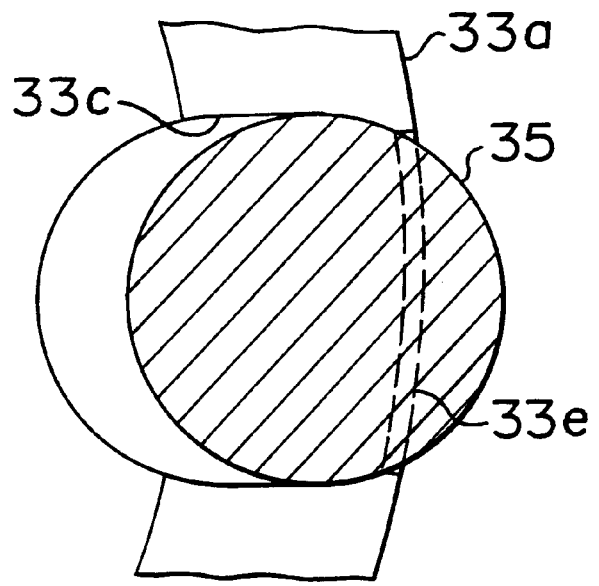

As shown in FIG. 24, a contact point 37d where the inclined surface 37a contacts with the steel ball 35 and a contact point 33d where the upper portion of the ball hole 33c which passes the lower surface outer edge 33e of the lid 33a of said guide member 33 contacts with steel ball 35, make a pinching angle less than 180° outward away from the center 0 of the above steel ball 35, said pinching angle being inclined outward in an oblique lower direction.

However, symmetric point 35a of the steel ball center 0 at contact point 37d where the steel ball 35 contacts with inclined surface 37a as shown in FIG. 26(b) is positioned more outward than the lower surface outer edge 33e of the lid 33a of the guide member 33, the inner side of the disc hole 42a positioned between the above symmetric point 35a and the lower surface outer edge 33e of the lid at the time of insertion of the disc 42.

Figure 27A:
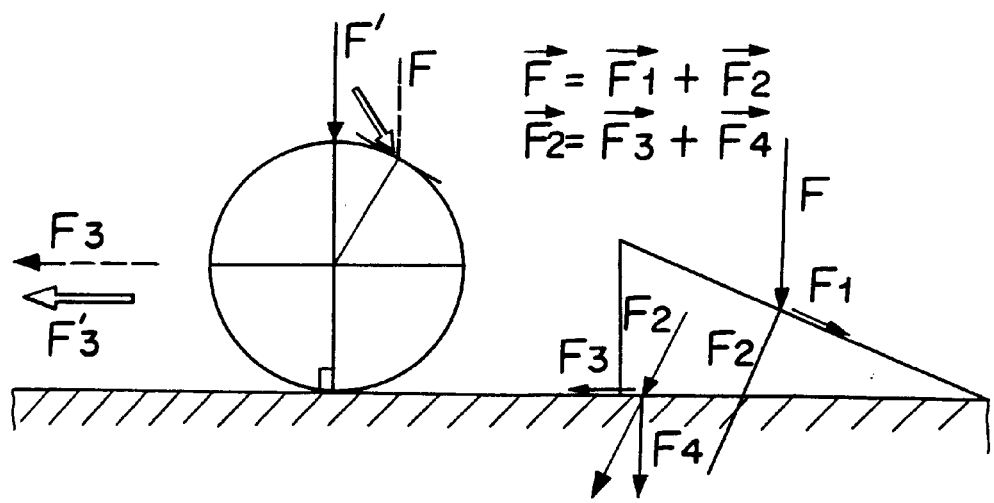
FIGS. 27(a)–(c) are explanation diagrams which show the relation between an angle of the inclined surface of the pressing plate and the transfer direction of the ball, respectively.
Figure 27B:
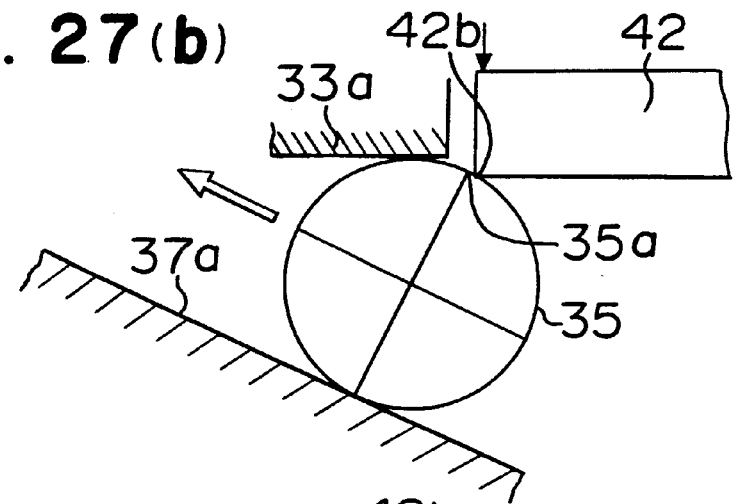
Figure 27C:
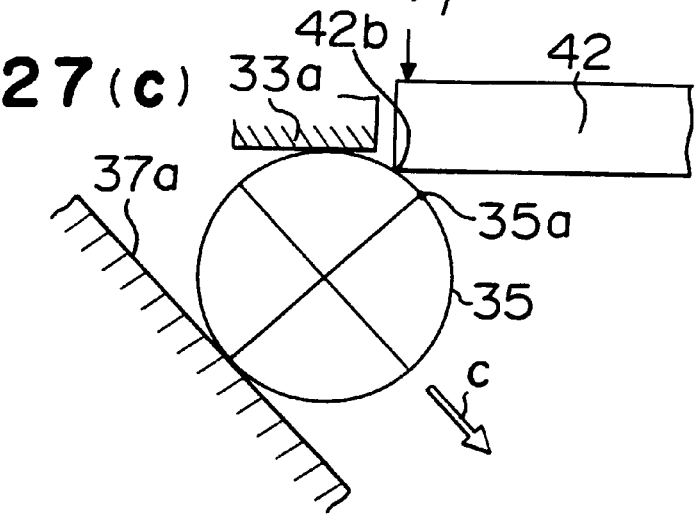

In this case, since the steel ball 35 is going in the direction of the arrow or outward as shown in FIG. 27(c), it is impossible to chuck the disc 42. In FIG. 26(b), e and f represent the impossible and possible clamping ranges, respectively.

Accordingly, in this embodiment, the inclined surface 37a shown in FIG. 26(b) is formed by the clamping inclined surface 37b and the inclined surface for transference 37c extendedly provided therefore as shown in FIG. 26(a), the inclined angle thereof controlled by the inclined surface for transference 37c whereby the point of the symmetry 35a in regard of the steel ball center 0 of the contact point 37d with the inclined surface is made to correspond to the lower surface outer edge 33e of the lid of the guide member 33.

FIGS. 27(a) to (c) shows the transfer direction of the steel ball due to the relation between the position of the symmetric point 35a and the contact position of the lower edge 42b of the inner side of the disc hole.

Figure 25:
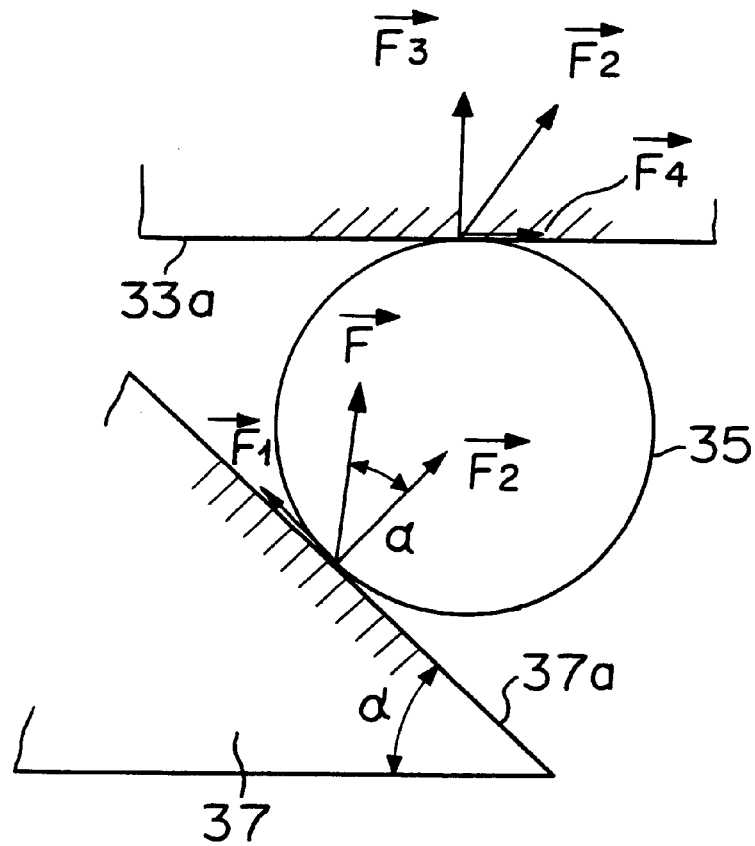
FIG. 25 is an explanation diagram of an angle 2 of an inclined surface for transferring the ball to the outer circumferential side by maximum force.
Figure 26:
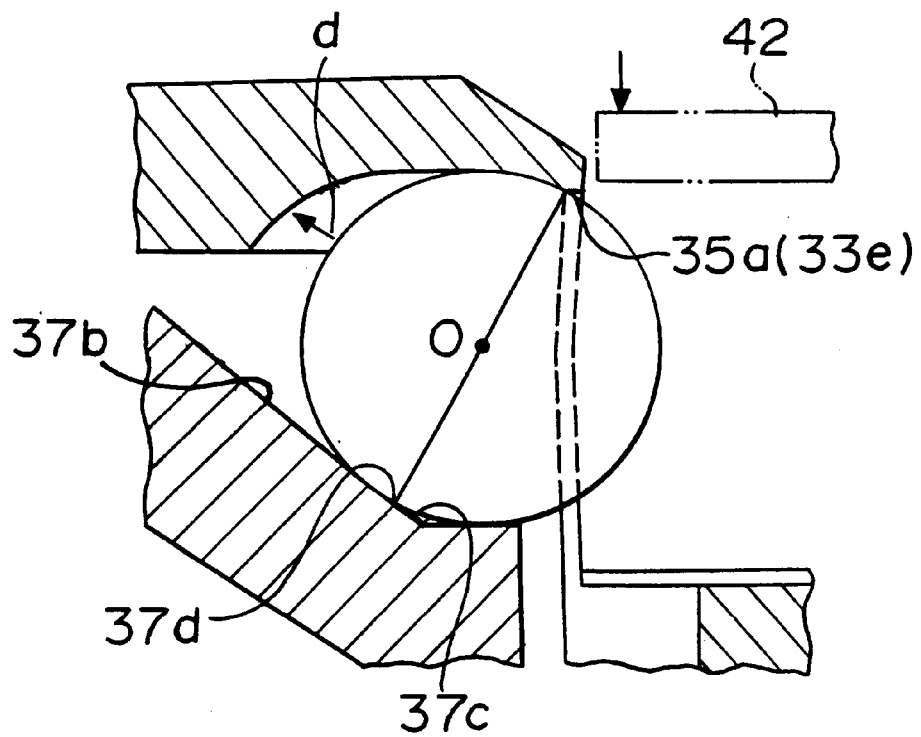
FIG. 26(a) is an explanation diagram wherein the inclined surface of the pressing plate comprises an inclined surface for clamping and an inclined surface for transferring and (b) is an explanation diagram not including the inclined surface for transferring.
Figure 26:
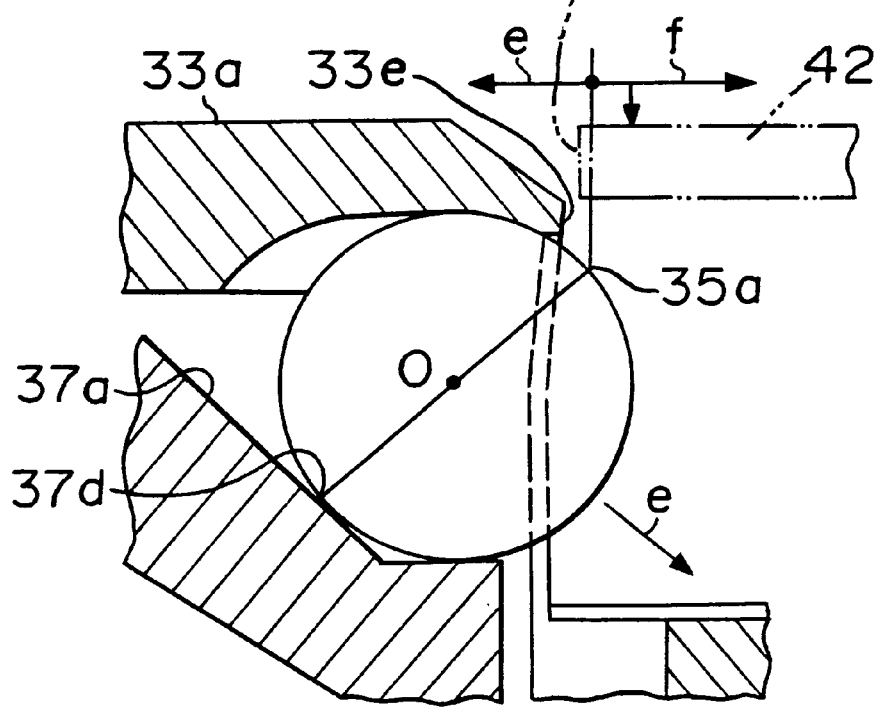

When the steel ball 35 is urged in a direction of the outer circumference at the inclined surface 37a of the pressing plate 37 as shown in FIG. 25, if a force added to the pressing plate 37 and a force which moves the steel ball are shown F and $F_4$, respectively, an inclined angle of said clamping inclined surface 37b should be nearly 45 degrees because the inclined angle which moves the steel ball in the outer circumferential direction with a maximum force is 45 degrees. In the figure, 33a is a lid of the guide member 33.

Further, when the construction is adapted to urge the steel ball 35 in the circumferential direction by the inclined surface, elastically energized force in the outer circumferential direction is always applied to the steel ball by aid of the inclined surface 37a in a state where the disc 42 is not installed. As a stopper which obstructs it, there exists only one which is a small projection at the lower surface outer edge 33e of the lid of the guide member shown in FIG. 24. Accordingly, when a large force is applied, the steel ball 35 will get over the stopper.

Figure 23:
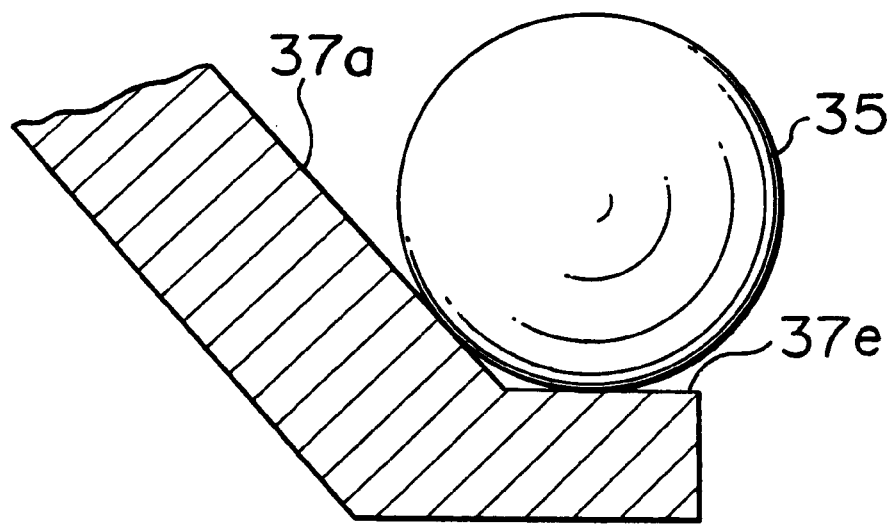
FIG. 23(a) is an explanation diagram of an even surface extendedly provided to the pressing plate and (b) is an explanation view of an ascending inclined surface extendedly provided to the pressing plate.
Figure 23:
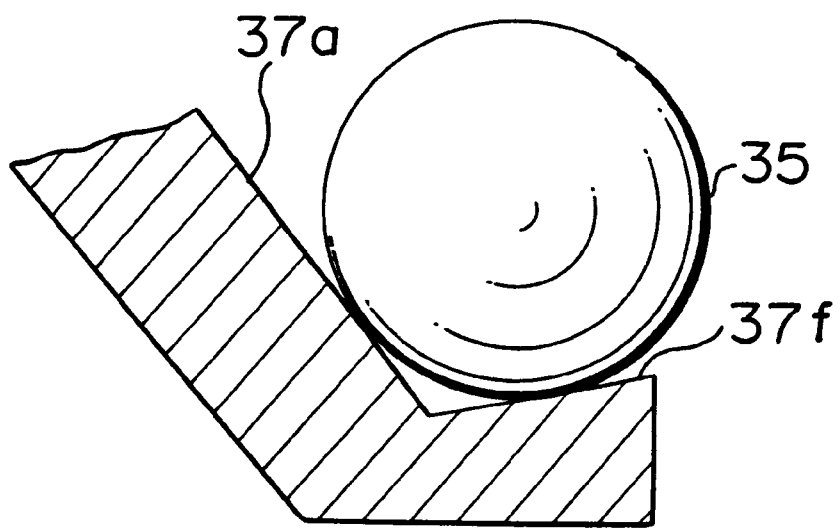

Accordingly, in this embodiment, at the most outer circumferential position of the steel ball where the disc 42 is not installed, nearly a horizontal even surface 37e or an ascending inclined surface 37f each having a certain width is provided at the end portion of the inclined surface 37a as shown in FIG. 23, so that the urged force does not occur in the outer circumferential direction.

Figure 28A:
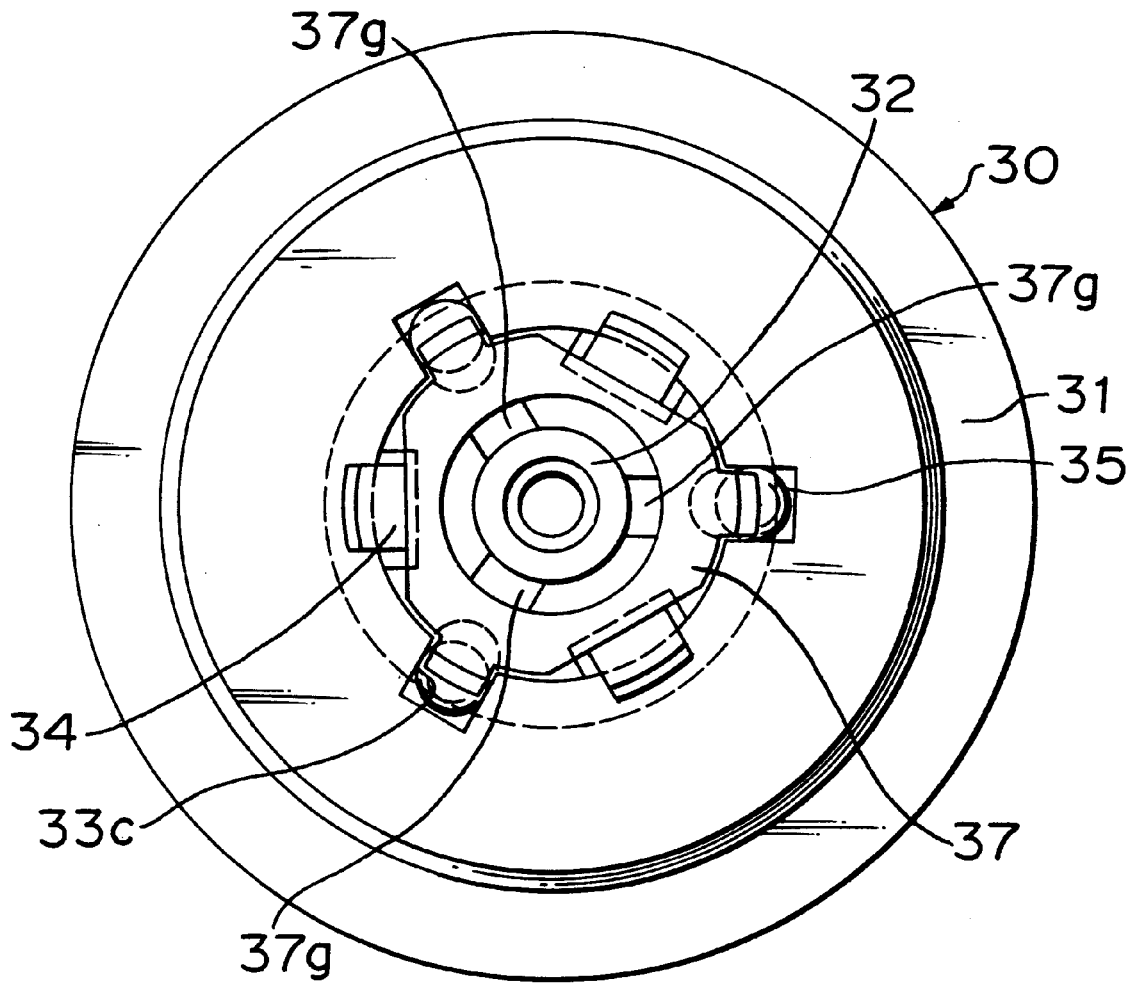
FIG. 28(a) is a lower surface view of the turntable where a plurality of projections are provided at the lower surface of the pressing plate and (b) is a longitudinal sectional view of (a).
Figure 28B:
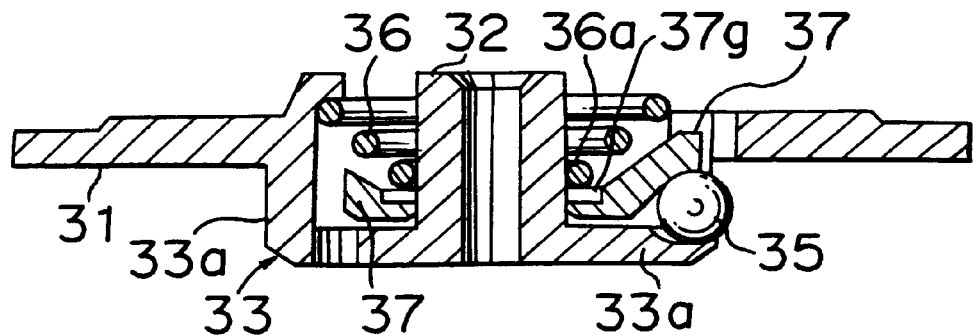

Further, as shown in FIG. 28(b), though the steel ball 35 is urged by the compression coil spring 36 through the pressing plate 37, the terminal portion 36a of the compression coil spring has a step difference. Accordingly, when the contact portion of said lower surface of the pressing plate 37 (the upper surface in FIG. 28(b)) and the terminal portion 36a of the compression coiled spring 36 is a plan, the contact point between the pressing plate 37 and the compressed coil spring 36 becomes indefinite whereby urged force might not be equally applied to a plurality of steel balls 35. Accordingly, a plurality of projections 37g (e.g., 3 pieces) which contact with the compression coil spring 36 are provided at the lower surface of the pressing plate 37 (upper surface in FIG. 28(b)) as shown in FIG. 28.

The following effects can be obtained according to this invention.

Although the former guide member is forcibly inserted into a separately-prepared turntable, the guide member of this invention is formed integrally with the turntable. Accordingly, the number of parts decreases and the forcible insertion process is also eliminated, thereby improving operational efficiency.

Further, since the urged force which elastically energizes the ball outward is performed by coil spring, not by an elastic body such as rubber, a decrease of the urged force due to changes over time does not occur.

Another embodiment of this invention will be described in detail with reference to FIG. 29 and FIG. 30.

Figure 29:
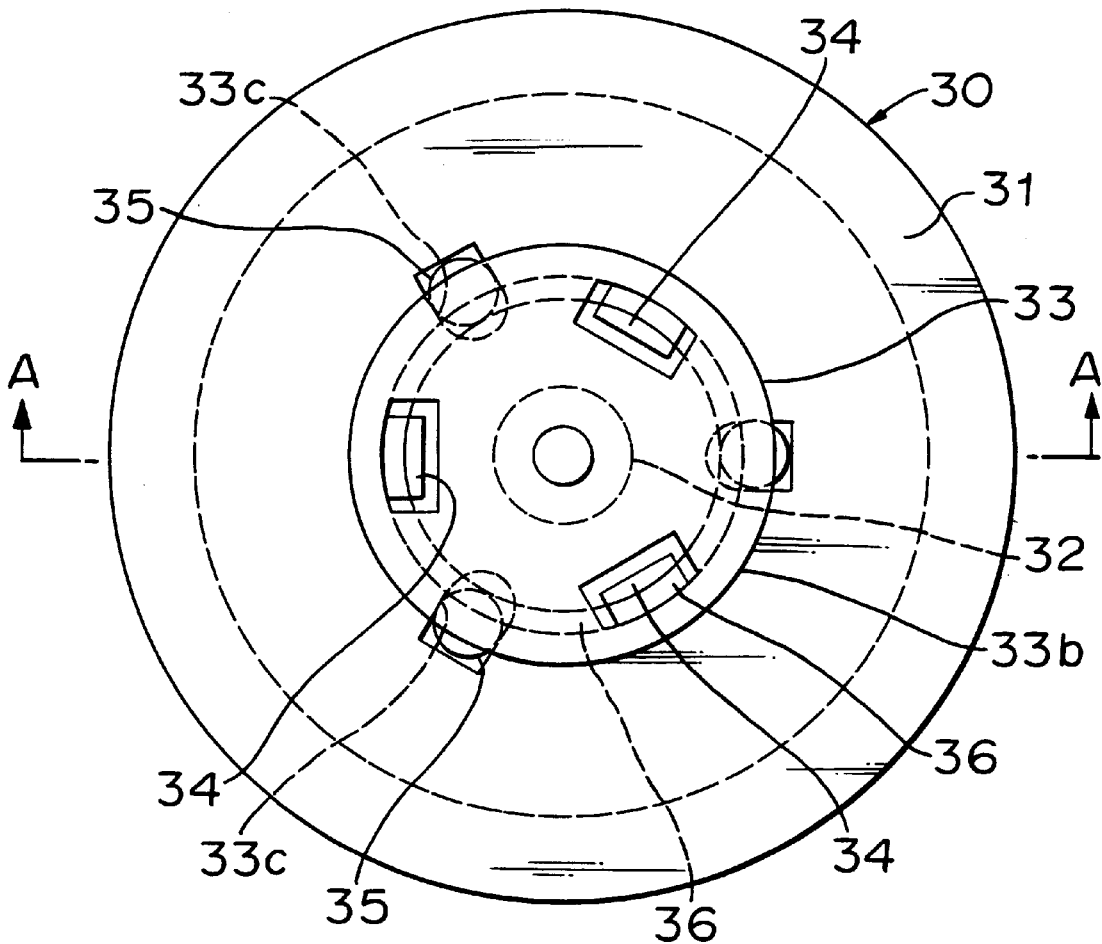
FIG. 29 is another embodiment of this invention, (a) being a plan view of the turntable thereof and (b) a side view of the whole body.
Figure 29:
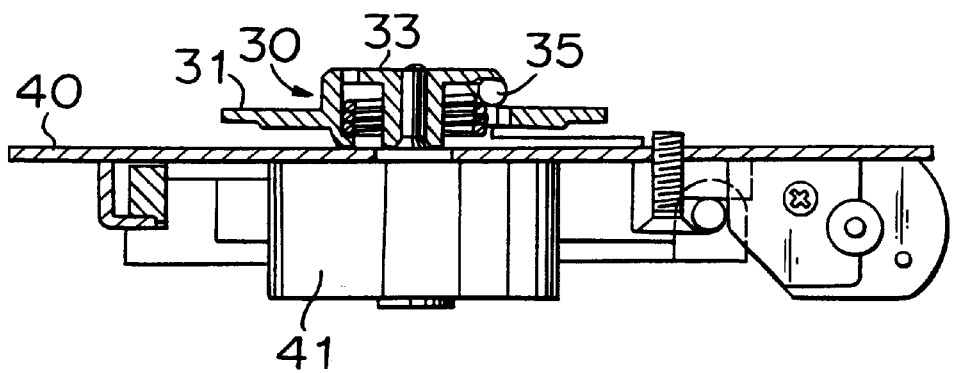

FIG. 29 is a plan and a whole side view of the turntable 30, and FIG. 30 is a clamp operation diagram of the disc 42.

In FIG. 29, 31 is a table portion, 33 is a guide member, and 32 is a boss, said guide member 33 being protruded into the center of the upper surface of the turntable 30 and formed in a cylindrical state having a closed lid 33a at the upper surface thereof. At the center of the lower surface of said turntable 30, a plurality (e.g., 30 pieces) of spring receivers 34 are protruded concentrically with said guide member 33. At the cylinder 33(b), a plurality (e.g. 3 pieces) of ball holes 33c are provided and a plurality (e.g. 3 pieces) of steel balls 35, 35, 35 are arranged in said ball holes, respectively. Between the steel ball 35 and said spring receiver 34 is installed the coil spring 45. Further, 40 is a chassis and 41 is a motor.

Said steel ball 35 may be a hard plastic or metal other than steel.

Figure 30A:
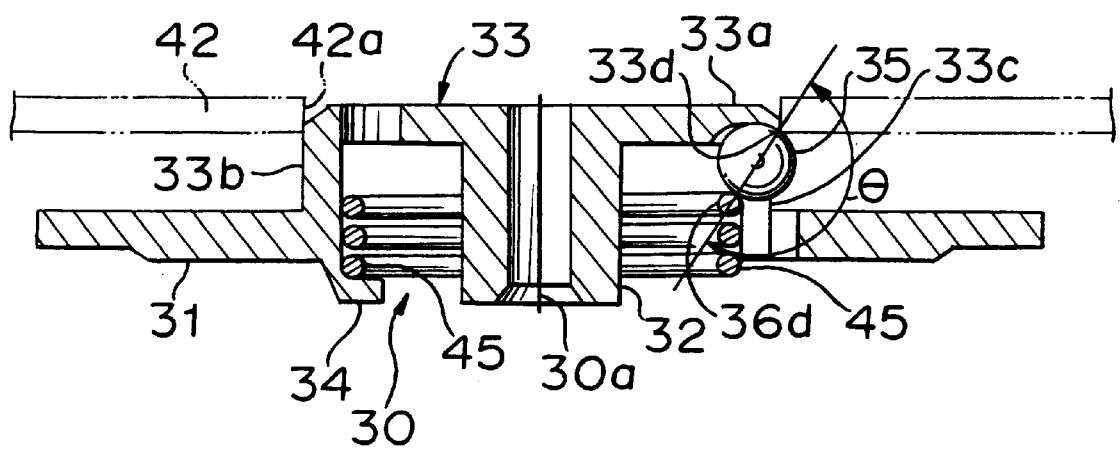
FIG. 30 is another embodiment of this invention, in which (a) to (c) are sectional views taken along line A—A of FIG. 29(a) which is an operational explanation diagram when the disc is installed to the disc clamp device.

As shown in FIG. 30, three ball holes 33c are formed at the outer side of the cylinder 33b so that a part of the steel ball 35 may be seen until the position shown in FIG. 30(a), and the upper portion of the steel ball 35 is adapted to touch the lower surface outer edge of the lid 33a. Further, a pinching angle o formed by connecting from the contact point 33d of the steel ball 35 with the outer edge of said lid 33a and the contact point 36d of said steel ball 35 with the upper end surface of the coil spring 36 to the center of the steel ball 35 is constructed to be less than 180° (<180 degrees).

Figure 30B:
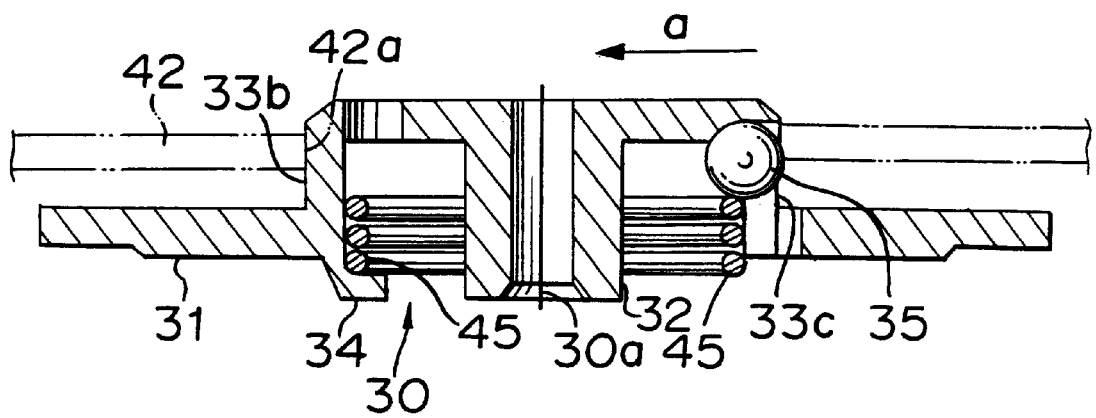
Figure 30C:
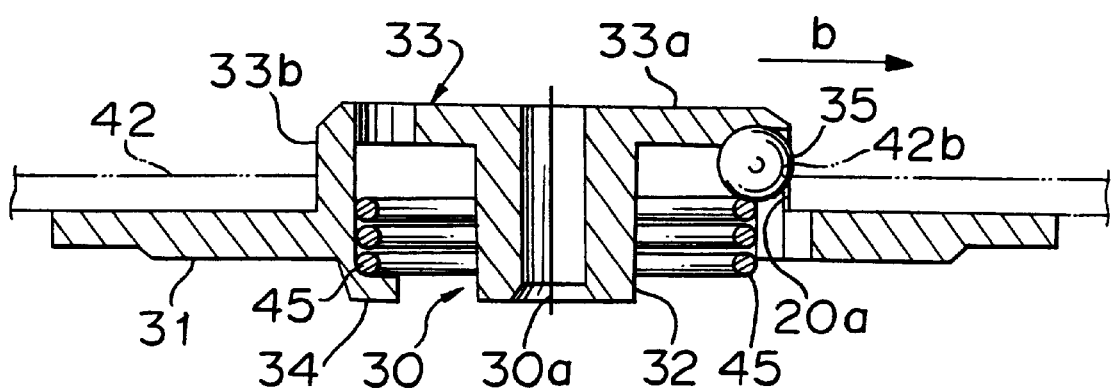
Figure 31A:
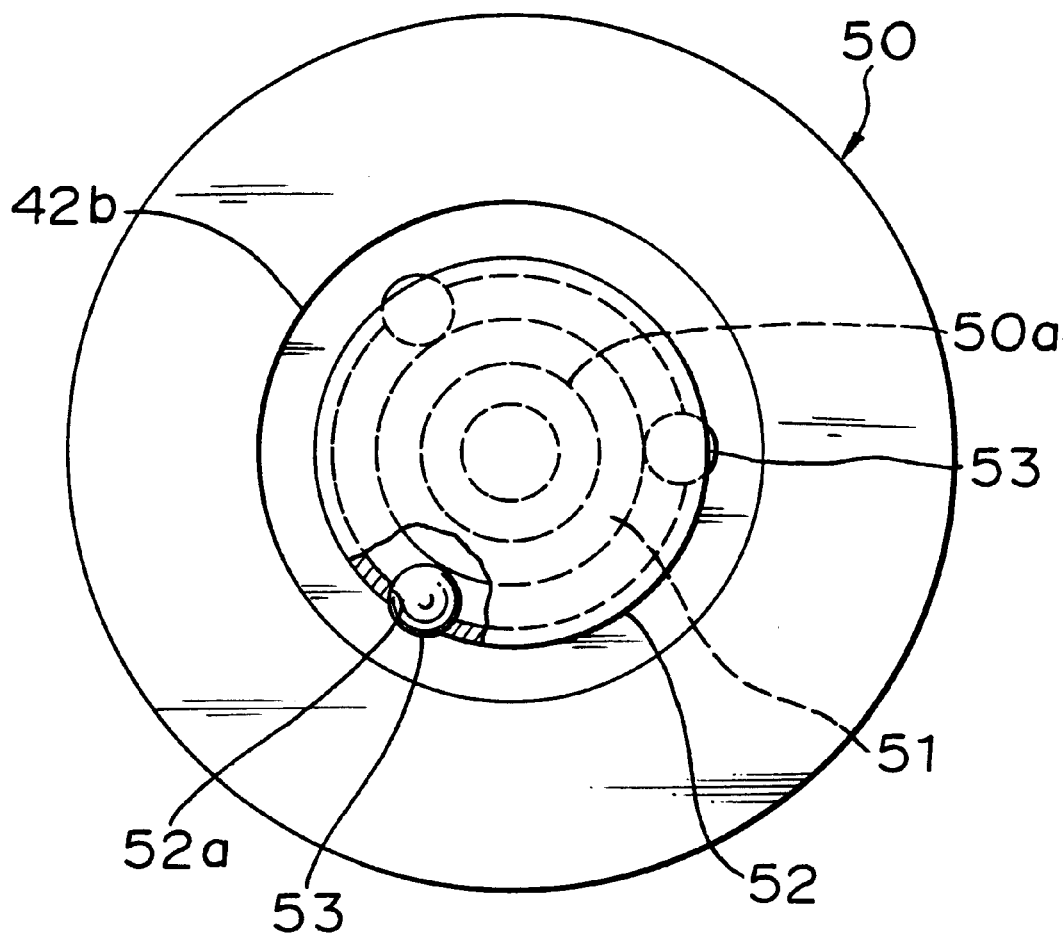
FIG. 31 is a conventional disc clamp device view, (a) being a plan view and (b) a longitudinal sectional view thereof.
Figure 31B:
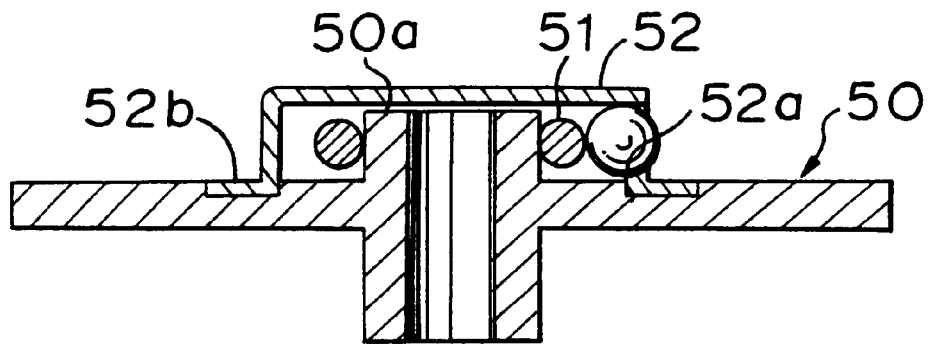

In order to install the disc 42 on the turntable, when the disc hole 42a of the disc 42 shown in a chain line is pushed down along the outer edge of the lid 33a as shown in FIG. 30(a), the steel ball 35 retracts in an axial center 30a direction of the turntable 30 at the inner side of the disc hole 42a, or into the ball hole 33c by being pushed in the direction shown in FIG. 30(b). When the disc 42 is further pushed down, the inner side of the disc hole 42a is put obliquely below the steel ball 35 as shown in FIG. 30(c). In other words, since the obliquely lower portion of the steel ball 35 contacts the upper edge 42b of the inner side of the disc hole 42a by elastically energizing due to the coil spring 45, disc 42 is pressed against the upper surface of the table portion 31 of the turntable 30 by a certain surface pressure thereby being held so as not to come off during rotation.

In FIG. 30(a), if o is ≧180 degrees, since the steel ball 35 does not move in direction "a", but moves in an outward direction shown by arrow "b" in FIG. 30(c) when the disc 42 is installed at turntable 30, the installation of the disc 42 is impossible.

According to the embodiment of this invention described above in detail, the following effects can be obtained.

Although the former guide member is prepared separately and forcibly inserted into the turntable, in this invention both guide member and turntable are formed integrally. Accordingly, the decrease in number of parts and of the assembly process can be obtained.

Further, since the urged force by which the ball is elastically energized outward is not due to an elastic body such as rubber, but rather to the coil spring, there is no decrease in urged force due to changes over time.

What is claimed is:

1. A disc clamp device for clamping a disc, and having a turntable with a hollow central cylindrical portion, comprising:

a guide member arranged in said hollow central cylindrical portion, said guide member including a boss portion and an upper flange portion having a lower surface formed around said boss portion;

a pressing plate arranged in said hollow central cylindrical portion and movable upwardly and downwardly along said boss portion, said pressing plate including an inclined upper surface and a lower surface;

a spring supporting portion formed at a lower portion of said hollow central cylindrical portion of said turntable;

a coil spring arranged between said lower surface of said pressing plate and said spring supporting portion so as to bias said pressing plate upwardly; and a plurality of balls arranged between said lower surface of said upper flange portion and said inclined upper surface of said pressing plate, with each of said plurality of balls being pinched at a first position on said lower surface of said upper flange portion and a second position on said inclined upper surface of said pressing plate, and said first position existing outside said second position;

wherein said balls are changed in position inwardly by an inner edge of said disc and then outwardly by a spring force of said coil spring acting on said pressing plate, whereby said disc is clamped on said turntable by said balls being in their spring back positions.

2. A disc damp device according to claim 1, wherein said disc includes a central hollow portion defined by an inner edge, and said pressing plate includes a first flat upper surface extending from a lower end portion of said inclined upper surface, whereby said plurality of balls can be supported by said first flat upper surface in a state that said plurality of balls are pushed downwardly by said inner edge of said disc.

3. A disc clamp device according to claim 2, wherein said pressing plate includes a second flat upper surface extending from a upper end portion of said inclined upper surface.

4. A disc clamp device according to any one of claims 1 to 3, wherein said upper flange includes a plurality of ball receiving portions formed on said lower surface of said upper flange, each of said plurality of ball receiving portions including a recessed portion and a closed end formed outside said recessed portion, and said first position is at said closed end.

5. A disc clamp device for clamping a disc, and having a turntable with a hollow central cylindrical portion, comprising:

a guide member arranged in said hollow central cylindrical portion, said guide member including a boss portion and a lower flange portion having an upper surface formed around said boss portion;

a pressing plate arranged in said hollow central cylindrical portion and movable upwardly and downwardly along said boss portion, said pressing plate including an inclined lower surface and an upper surface;

a spring supporting portion formed at an upper portion of said hollow central cylindrical portion of said turntable;

a coil spring arranged between said upper surface of said pressing plate and said spring supporting portion so as to bias said pressing plate downwardly; and a plurality of balls arranged between said upper surface of said lower flange portion and said inclined lower surface of said pressing plate, each of said plurality of balls being pinched at a first position on said upper surface of said lower flange portion and a second position on said inclined lower surface of said pressing plate, and said first position existing outside said second position;

wherein said balls are changed in position inwardly by an inner edge of said disc and then outwardly by a spring force of said coil spring acting on said pressing plate, whereby said disc is clamped on said turntable by said balls being in their spring back positions.

6. A disc clamp device according to claim 5, wherein said pressing plate includes a first flat lower surface extending from an upper end portion of said inclined lower surface, whereby said plurality of balls are supported by said first flat lower surface in a state that said plurality of balls exist at upper most positions thereof.

7. A disc clamp device according to claim 6, wherein said pressing plate includes a second flat lower surface extending from a lower end portion of said inclined lower surface.

8. A disc clamp device according to any one of claims 5 to 7, wherein said lower flange includes a plurality of ball receiving portions formed on said upper surface of said lower flange, each of said plurality of ball receiving portions including a recessed portion and a closed end formed outside said recessed portion, and said first position is at said closed end.

\* \* \* \* \*